United States Patent
Wang et al.

(10) Patent No.: US 12,245,230 B2
(45) Date of Patent: Mar. 4, 2025

(54) METHOD AND APPARATUS FOR HYBRID AUTOMATIC REPEAT REQUEST ACKNOWLEDGMENT CODEBOOK TRANSMISSION AND RECEPTION

(71) Applicant: Samsung Electronics Co., Ltd., Suwon-si (KR)

(72) Inventors: Yi Wang, Beijing (CN); Sa Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/736,512

(22) Filed: May 4, 2022

(65) Prior Publication Data

US 2022/0377773 A1    Nov. 24, 2022

(30) Foreign Application Priority Data

May 8, 2021    (CN) .......................... 202110502330.0
Nov. 26, 2021    (CN) .......................... 202111424624.2
Nov. 29, 2021    (CN) .......................... 202111436219.2

(51) Int. Cl.
*H04W 72/1273*    (2023.01)
*H04L 1/1812*    (2023.01)
(Continued)

(52) U.S. Cl.
CPC ....... *H04W 72/1273* (2013.01); *H04L 1/1812* (2013.01); *H04L 5/0053* (2013.01); *H04W 72/0446* (2013.01); *H04W 72/23* (2023.01)

(58) Field of Classification Search
CPC ... H04L 1/1812; H04L 5/0053; H04L 1/1861; H04L 1/1896; H04L 5/0094;
(Continued)

(56) References Cited

U.S. PATENT DOCUMENTS

2016/0050060 A1*    2/2016    Seo .................... H04L 1/1893
                                                            370/280
2017/0214494 A1*    7/2017    Qiang ................ H04L 1/0003
(Continued)

FOREIGN PATENT DOCUMENTS

WO    2020/235884 A1    11/2020

OTHER PUBLICATIONS

LG Electronics, "PDSCH/PUSCH enhancements to support NR above 52.6 GHz", R1-2103343, 3GPP TSG RAN WG1 #104b-e, e-Meeting, Apr. 7, 2021.
(Continued)

*Primary Examiner* — Benjamin H Elliott, IV
(74) *Attorney, Agent, or Firm* — Jefferson IP Law, LLP

(57) ABSTRACT

The disclosure relates to a $5^{th}$ Generation (5G) or $6^{th}$ Generation (6G) communication system for supporting a higher data transmission rate. A method performed by a user equipment (UE) is provided. The method includes receiving, by the UE, a physical downlink control channel (PDCCH), wherein the received PDCCH includes downlink control information (DCI) for scheduling one or more physical downlink shared channels (PDSCHs), receiving, by the UE, one or more PDSCHs according to the received DCI, determining and transmitting, by the UE, a hybrid automatic repeat request acknowledgment (HARQ-ACK) codebook for one or more PDSCHs according to the received PDSCHs and PDCCH.

20 Claims, 15 Drawing Sheets

(51) Int. Cl.
 *H04L 5/00* (2006.01)
 *H04W 72/0446* (2023.01)
 *H04W 72/23* (2023.01)

(58) Field of Classification Search
 CPC ............ H04L 5/0055; H04W 72/1273; H04W 72/0446; H04W 72/23
 See application file for complete search history.

(56) References Cited

U.S. PATENT DOCUMENTS

| | | | | |
|---|---|---|---|---|
| 2020/0196346 | A1* | 6/2020 | Khoshnevisan | H04L 5/0053 |
| 2020/0214030 | A1* | 7/2020 | Park | H04L 5/001 |
| 2020/0344012 | A1* | 10/2020 | Karaki | H04L 1/1861 |
| 2020/0389897 | A1* | 12/2020 | Mondal | H04L 5/0044 |
| 2021/0105102 | A1* | 4/2021 | Li | H04L 1/1896 |
| 2021/0168762 | A1* | 6/2021 | Huang | H04L 1/1864 |
| 2022/0110094 | A1* | 4/2022 | Huang | H04W 72/02 |
| 2022/0116153 | A1* | 4/2022 | Hosseini | H04L 5/0053 |
| 2022/0159692 | A1* | 5/2022 | Lee | H04L 5/0053 |
| 2022/0167352 | A1* | 5/2022 | Bhamri | H04L 5/0053 |
| 2022/0217756 | A1* | 7/2022 | Wu | H04L 1/1861 |
| 2022/0255682 | A1* | 8/2022 | Gao | H04L 1/1861 |
| 2022/0322326 | A1* | 10/2022 | Wong | H04L 1/1854 |
| 2022/0377773 | A1* | 11/2022 | Wang | H04W 72/0446 |
| 2023/0058397 | A1* | 2/2023 | Harada | H04L 1/1854 |
| 2023/0059563 | A1* | 2/2023 | Harada | H04L 5/0048 |
| 2023/0163900 | A1* | 5/2023 | Kim | H04L 1/1893 370/329 |
| 2023/0171043 | A1* | 6/2023 | Yang | H04L 5/0078 714/726 |
| 2023/0216614 | A1* | 7/2023 | Wang | H04L 1/1822 370/329 |
| 2024/0073916 | A1* | 2/2024 | Huang | H04W 72/23 |
| 2024/0137952 | A1* | 4/2024 | Li | H04W 72/232 |

OTHER PUBLICATIONS

Wilus Inc., "Discussion on multi-PDSCH/PUSCH scheduling for NR from 52.6GHz to 71GHz", R1-2103693, 3GPP TSG RAN WG1 #104b-e, e-Meeting, Apr. 7, 2021.
International Search Report dated Aug. 9, 2022, issued in International Application No. PCT/KR2022/006427.
OPPO: "HARQ-ACK enhancements for Rel-17, URLLC/IIoT", 3GPP Draft; R1-2102392, vol. RAN WG1, No. e-Meeting, XP052177109, Apr. 7, 2021.
Spreadtrum Communications: "Discussion on HARQ-ACK feedback enhancements", 3GPP Draft; R1-2102454, vol. RAN WG1, No. e-Meeting, XP052177162, Apr. 7, 2021.
Moderator (Nokia): "Moderator summary #4 on HARQ-ACK feedback enhancements for NR Rel-17 URLLC/IIoT", 3GPP Draft; R1-2104038, vol. RAN WG1, No. e-Meeting, XP051996622, Apr. 20, 2021.
European Search Report dated Jul. 26, 2024, issued in European Application No. 22807714.5.

* cited by examiner

METHOD AND APPARATUS FOR HYBRID AUTOMATIC REPEAT REQUEST ACKNOWLEDGMENT CODEBOOK TRANSMISSION AND RECEPTION

CROSS-REFERENCE TO RELATED APPLICATION(S)

This application is based on and claims priority under 35 U.S.C. § 119(a) of a Chinese patent application number 202110502330.0, filed on May 8, 2021, in the Chinese National Intellectual Property Administration, of a Chinese patent application number 202111424624.2, filed on Nov. 26, 2021, in the Chinese National Intellectual Property Administration, and of a Chinese patent application number 202111436219.2, filed on Nov. 29, 2021, in the Chinese National Intellectual Property Administration, the disclosure of each of which is incorporated by reference herein in its entirety.

BACKGROUND

1. Field

The disclosure relates to the field of wireless communication technology. More particularly, the disclosure relates to a method and device for signal transmission.

2. Description of Related Art $5^{th}$ Generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ Generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional multiple-input multiple-output MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

In order to meet the increasing demand for wireless data communication services since the deployment of $4^{th}$ generation (4G) or long term evolution (LTE) communication systems, efforts have been made to develop improved 5G or pre-5G communication systems. Therefore, 5G or pre-5G communication systems are also called "Beyond 4G networks" or "Post-LTE systems."

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming, and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-point (CoMP), reception-end interference cancellation, etc.

In 5G systems, hybrid frequency shift keying (FSK) and quadrature amplitude modulation (QAM) modulation (FQAM) and sliding window superposition coding (SWSC) as advanced coding modulation (ACM), and filter bank multicarrier (FBMC), non-orthogonal multiple access (NOMA), and sparse code multiple access (SCMA) as advanced access technologies have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for signal transmission.

Additional aspects will be set forth in part in the description which follows and, in part, will be apparent from the description, or may be learned by practice of the presented embodiments.

In accordance with an aspect of the disclosure, a method performed by a user equipment (UE) is provided. The method includes receiving, by the UE, a physical downlink control channel (PDCCH), wherein the received PDCCH includes downlink control information (DCI) for scheduling one or more physical downlink shared channels (PDSCHs), receiving, by the UE, one or more PDSCHs according to the received DCI, determining and transmitting, by the UE, a hybrid automatic repeat request acknowledgment (HARQ-ACK) codebook for one or more PDSCHs according to the received PDSCHs and PDCCH.

Optionally, determining and transmitting, by the UE, a hybrid automatic repeat request acknowledgment (HARQ-ACK) codebook for one or more PDSCHs according to the received PDSCHs and PDCCH includes by the UE, determining PDSCH bundles and separately generating HARQ-ACK bits for each PDSCH bundle.

Optionally, by the UE, determining PDSCH bundles includes one or more of the following.

According to the number of PDSCHs scheduled by the received DCI and the number of PDSCHs in a PDSCH bundle configured by the base station, the UE determines the number of PDSCH bundles corresponding to the PDSCHs scheduled by the DCI and the number of PDSCHs in a PDSCH bundle, According to the number of PDSCHs scheduled by the received DCI and the number of bundles corresponding to one DCI or the number of HARQ-ACK bits corresponding to one DCI configured by the base station, the UE determines the number of PDSCH bundles corresponding to the PDSCHs scheduled by the DCI and the number of PDSCHs in a PDSCH bundle, According to the intervals between time domain resources of respective PDSCHs scheduled by the received DCI and the maximum time length of one PDSCH bundle configured by the base station, the UE determines the number of PDSCH bundles corresponding to the PDSCHs scheduled by the DCI and the number of PDSCHs in a PDSCH bundle.

Optionally, generating HARQ-ACK bits for each PDSCH bundle respectively includes generating one HARQ-ACK information bit for PDSCHs within a PDSCH bundle by predefined processing methods, wherein the predefined processing methods includes at least one of the following, AND, logical AND, XOR, OR, and logical OR.

Optionally, generating HARQ-ACK bits for each PDSCH bundle respectively includes if the UE is configured with Type-2 HARQ-ACK codebook, the UE generates HARQ-ACK bits according to the number of PDSCH bundles and the downlink assignment index (DAI) in the received DCI.

Optionally, if the Type-2 HARQ-ACK codebook consists of X (X>1) sub-codebooks, UE determines a sub-codebook in which the HARQ-ACK of the PDSCH scheduled by one DCI is located, according to whether the number of PDSCH bundles corresponding to the PDSCH scheduled by the one DCI exceeds the predefined threshold Tbun, wherein the number of HARQ-ACK bits of a sub-codebook is determined according to the maximum number of PDSCH bundles of the sub-codebook.

Optionally, the predefined threshold Tbun is equal to 1 or 2, or the predefined threshold Tbun is configured by the base station.

Optionally, the number of HARQ-ACK bits of a first sub-codebook is determined based on the downlink assignment index (DAI) in DCIs associated with the first sub-codebook and the number of HARQ-ACK bits corresponding to each DAI of the first sub-codebook, wherein the number of HARQ-ACK bits corresponding to each DAI of the first sub-codebook is determined by Tbun or the maximum number of transport blocks corresponding to one PDSCH, the number of HARQ-ACK bits of a second sub-codebook is determined based on the DAI in DCIs associated with the second sub-codebook and the number of HARQ-ACK bits corresponding to each DAI of the second sub-codebook, wherein the number of HARQ-ACK bits corresponding to each DAI of the second sub-codebook is determined by the maximum number of PDSCH bundles (Nb_max) corresponding to PDSCHs which can be scheduled by a DCI.

Optionally, if the Type-2 HARQ-ACK codebook consists of only one sub-codebook, the UE determines the number of HARQ-ACK bits corresponding to one DCI according to the downlink assignment index (DAI) of the DCI of the sub-codebook and the maximum number of PDSCH bundles (Nb_max) corresponding to PDSCHs which can be scheduled by a DCI.

Optionally, the number of the downlink assignment index (DAI) is the number based on the number of DCIs.

Optionally, the number of the downlink assignment index (DAI) is the number based on the number of PDSCH bundles, and if the number of actually scheduled PDSCH bundles corresponding to PDSCHs scheduled by one DCI is greater than 1, the number of DAIs is counted according to the first PDSCH bundle among the multiple PDSCH bundles actually scheduled by the DCI, or is counted according to the last PDSCH bundle among the multiple PDSCH bundles actually scheduled by the DCI.

Optionally, the number of the downlink assignment index (DAI) is based on the number of PDSCH bundles per DCI configured by the base station, and if the number of PDSCH bundles corresponding to the PDSCHs scheduled by one DCI configured by the base station is greater than 1, the number of DAI is counted according to the first PDSCH bundle among the multiple PDSCH bundles corresponding to the DCI, or is counted according to the last PDSCH bundle among the multiple PDSCH bundles corresponding to the DCI.

Optionally, for the same HARQ-ACK sub-codebook, the value of the downlink assignment index (DAI) increases by 1 for every M increment of the number of DCIs which are actually scheduled, or the number of PDSCH bundles which are actually scheduled, or the number of PDSCH bundles corresponding to the actually scheduled DCIs based on the base station configuration.

Optionally, determining and transmitting, by the UE, a hybrid automatic repeat request acknowledgment (HARQ-ACK) codebook for one or more PDSCHs according to the received PDSCHs and PDCCH includes determining, by the UE, candidate PDSCH reception position units and/or the candidate PDSCH reception positions for placing respective HARQ-ACK bits in the HARQ-ACK codebook to determine the HARQ-ACK codebook according to at least one of the following information, the first time offset set K, the second time offset set K', the set of start symbol and symbol numbers (start and length indicator value (SLIV)) indicated by the PDSCH time domain resource allocation (TDRA) table R, time division duplex (TDD) uplink and/or downlink configuration information, PDCCH monitoring occasion configuration information, whether respective SLIVs overlap.

Optionally, the second time offset set K' is determined according to the time offset K1 of the HARQ-ACK feedback, the time domain resources of Np PDSCHs scheduled by one DCI, and the PDSCH bundle corresponding to the Np PDSCHs.

Optionally, determining the candidate PDSCH reception position units and/or the candidate PDSCH reception positions for placing respective HARQ-ACK bits in the HARQ-ACK codebook according to the set of SLIVs indicated by the PDSCH TDRA table R includes the following.

Composing one SLIVri(k) with the time domain resources SLIVri,j(k) for respective PDSCHs in one row of PDSCH TDRA table R, and determining the candidate PDSCH reception position units and/or the candidate PDSCH reception positions for placing respective HARQ-ACK bits in the HARQ-ACK codebook according to the SLIVri(k), or Composing one SLIVri(k) with the time domain resources SLIVri,j(k) for respective PDSCHs in a PDSCH bundle in one row of PDSCH TDRA table R, and determining the candidate PDSCH reception position units and/or the candidate PDSCH reception positions for placing respective HARQ-ACK bits in the HARQ-ACK codebook according to the SLIVri(k), or, Taking the time domain resource SLIVri,j(k) for a PDSCH in a row of PDSCH TDRA table R as one SLIVri,j(k), and determining the candidate PDSCH reception position units and/or the candidate PDSCH reception positions for placing respective HARQ-ACK bits in the HARQ-ACK codebook according to the SLIVri,j(k).

Optionally, determining the candidate PDSCH reception position units and/or the candidate PDSCH reception positions for placing respective HARQ-ACK bits in the HARQ-ACK codebook according to whether the SLIVs overlap includes the following.

Determining whether respective SLIVri(k) or SLIVri,j(k) overlap in multiple slots/sub-slots, and determining the candidate PDSCH reception position units and/or the candidate PDSCH reception positions for placing respective HARQ-ACK bits in the HARQ-ACK codebook according to the non-overlapping SLIV, or Determining whether respective SLIVri(k) or SLIVri,j(k) overlap in one slot/sub-slot, and determining the candidate PDSCH reception position unit and/or the candidate PDSCH reception position for placing respective HARQ-ACK bits in the HARQ-ACK codebook according to the non-overlapping SLIV.

Optionally, the number of candidate PDSCH reception positions included in the candidate PDSCH reception position units corresponding to one SLIVri(k) is determined in one of the following methods.

The number of candidate PDSCH reception positions included in the candidate PDSCH reception position units corresponding to one SLIVri(k) is determined by the number (Nb) of PDSCH bundles included in this SLIV, The number of candidate PDSCH reception positions included in the candidate PDSCH reception position units corresponding to one SLIVri(k) is determined by the maximum value of the numbers of PDSCH bundles corresponding to respective SLIVs, which are corresponding to the same candidate PDSCH reception position units as this SLIV, The number of candidate PDSCH reception positions included in the candidate PDSCH reception position unit corresponding to a SLIVri(k) is determined by the maximum value of the number of the PDSCH bindles (Nb_max) included in all the SLIVr$_l$, where l=1, 2 . . . l(R), The number of candidate PDSCH reception positions included in the candidate PDSCH reception position unit corresponding to one SLIVri(k) is 1.

Optionally, the number of candidate PDSCH reception positions included in the candidate PDSCH reception position unit corresponding to one SLIVri,j(k) is determined in one of the following methods.

The number of candidate PDSCH reception positions included in the candidate PDSCH reception position units corresponding to one SLIVri,j(k) is determined by the number of PDSCH bundles (Nb) included in this SLIV, The number of candidate PDSCH reception positions included in the candidate PDSCH reception position units corresponding to one SLIVri,j(k) is determined by the maximum value of the numbers of PDSCH bundles corresponding to respective SLIVs, which are corresponding to the same candidate PDSCH reception position units as this SLIV, The number of candidate PDSCH reception positions included in the candidate PDSCH reception position units corresponding to one SLIVri,j(k) is determined by the maximum value of the number of the PDSCH bindles (Nb_max) included in all the SLIVr$_l$, where l=1, 2 . . . l(R), The number of candidate PDSCH reception positions included in the candidate PDSCH reception position units corresponding to one SLIVri,j(k) is 1, The number of candidate PDSCH reception positions included in the candidate PDSCH reception position units corresponding to one SLIVri,j(k) is 0 or 1.

Optionally, the number of HARQ-ACK bits corresponding to one candidate PDSCH reception position is determined according to at least one of the following methods.

The number of HARQ-ACK bits corresponding to one candidate PDSCH reception position is determined by the number of HARQ-ACK bits corresponding to this PDSCH, The number of HARQ-ACK bits corresponding to one candidate PDSCH reception position is determined by the number of HARQ-ACK bits of one PDSCH bundle corresponding to this PDSCH reception position, The number of HARQ-ACK bits corresponding to one candidate PDSCH reception position is determined by the number of HARQ-ACK bits of Nq PDSCHs corresponding to this one PDSCH reception position, The number of HARQ-ACK bits corresponding to one candidate PDSCH reception position is the number of HARQ-ACK bits of one PDSCH bundle, or 0 bit.

Optionally, if the UE is triggered to transmit the third type HARQ-ACK codebook, the UE feeds back the HARQ-ACK of each PDSCH in the third type HARQ-ACK codebook respectively.

Optionally, in the cases that the UE is configured with PDSCH bundles by the base station, if the UE is triggered to transmit the third type HARQ-ACK codebook, the UE feeds back the bundled HARQ-ACK in the third type HARQ-ACK codebook, wherein the UE feeds back the bundled HARQ-ACK with respect to respective HARQ processes belonging to the same PDSCH bundle according to the PDSCH bundle relationship determined when being scheduled, or, wherein the UE feeds back the bundled HARQ-ACK only in the HARQ-ACK position of one of the multiple HARQ processes in the same PDSCH bundle, and feeds back the predefined HARQ-ACK value in the HARQ-ACK position of other HARQ processes.

In accordance with another aspect of the disclosure, a user equipment is provided. The UE includes a transceiver configured to transmit and receive signals, and a controller, to control the overall operation of the user equipment, wherein the UE is configured to perform the above method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be understood that the singular form of "a", "an" and "the" include plural references unless the context clearly indicates otherwise. Thus, for example, reference to "a component surface" includes reference to one or more such surfaces.

The term "includes" or "may include" refers to the presence of the correspondingly disclosed functions, operations or components that can be used in various embodiments of the disclosure, and does not limit the presence of one or more additional functions, operations or features. In addition, the term "comprising" or "having" can be construed to denote certain characteristics, numbers, steps, operations, constituent elements, components, or combinations thereof, but should not be construed as excluding the possibility of the presence of one more other characteristics, numbers, steps, operation, constituent elements, components, or combination thereof.

The term "or" used in various embodiments of the disclosure includes any listed terms and all combinations thereof. For example, "A or B" may include A, may include B, or may include both A and B.

Unless defined differently, all terms (including technical or scientific terms) used in the disclosure have the same meaning as understood by those skilled in the art that in the disclosure belongs to. The general terms as defined in the dictionary are interpreted as having a meaning consistent with the context in the related technical field, and should not be interpreted ideally or excessively formally unless explicitly defined as such in the disclosure.

Figure 1:
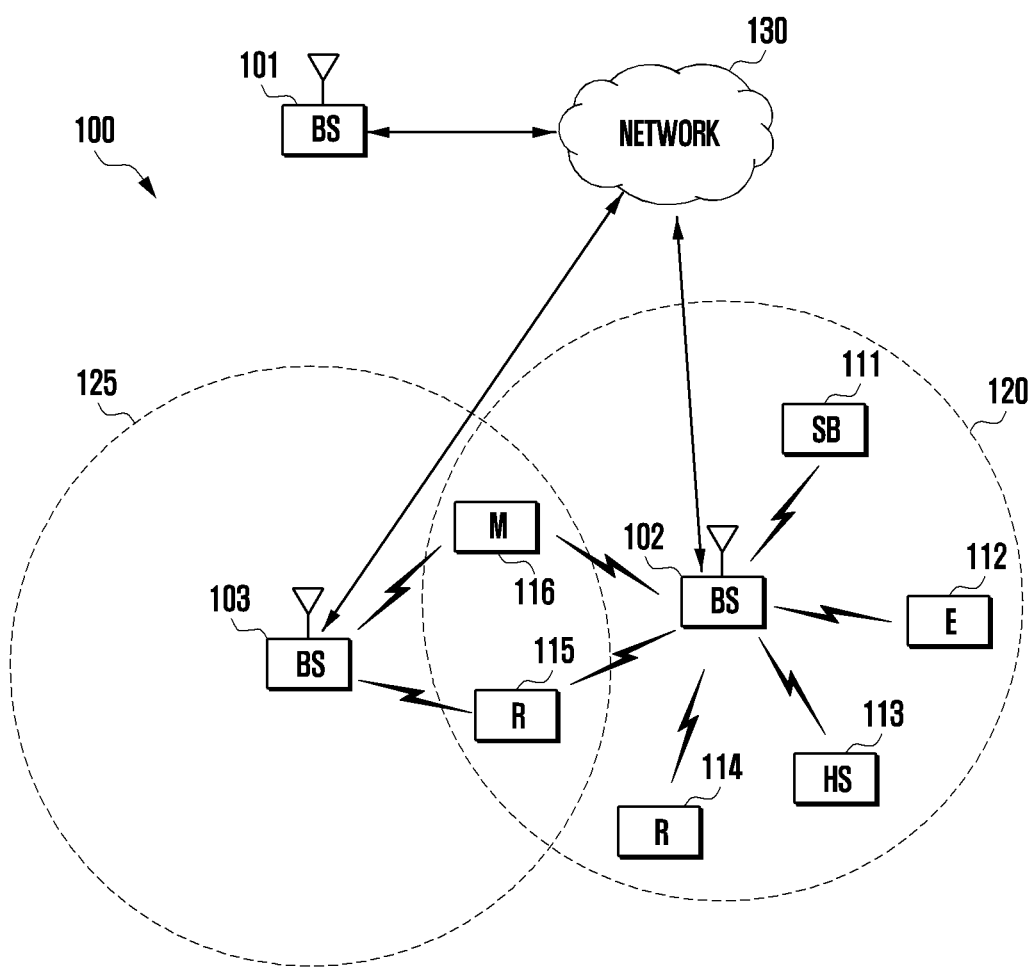
FIG. 1 illustrates an example wireless network according to an embodiment of the disclosure.

FIG. 1 illustrates an example wireless network 100 according to an embodiment of the disclosure. The embodiment of the wireless network 100 shown in FIG. 1 is for illustration only. Other embodiments of the wireless network 100 can be used without departing from the scope of the disclosure.

The wireless network 100 includes a next generation NodeB (gNodeB, gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" (UE). For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipment (UEs) within a coverage area 120 of gNB 102. The first plurality of UEs include a UE 111, which may be located in a Small Business (SB); a UE 112, which may be located in an enterprise (E); a UE 113, which may be located in a Wi-Fi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using $5^{th}$ generation (5G), Long Term Evolution (LTE), LTE-advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
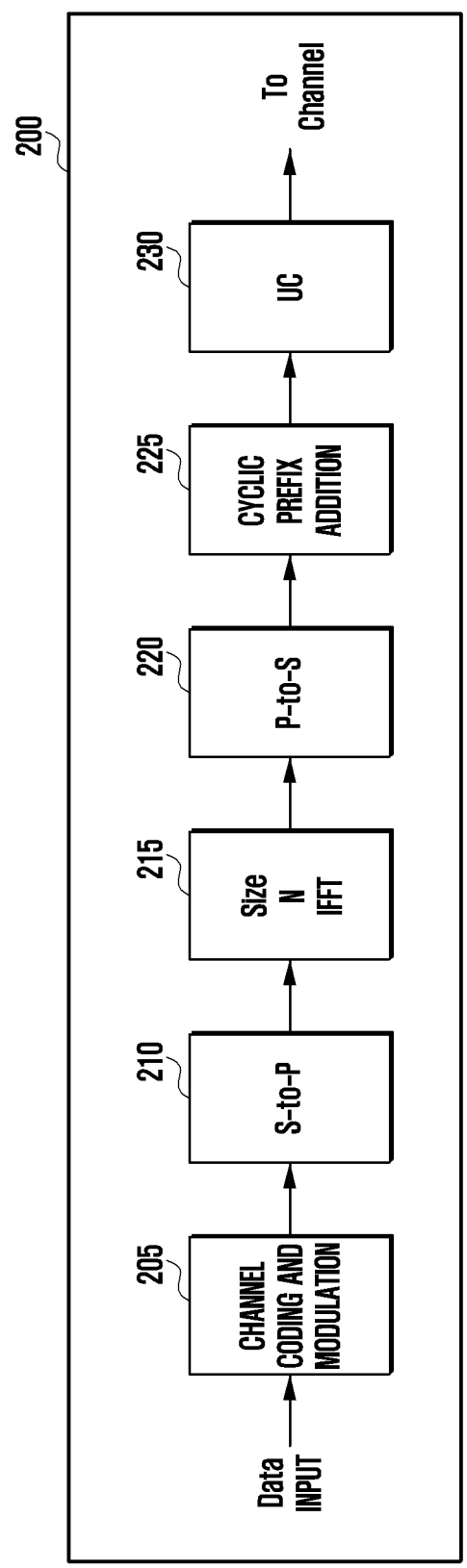
FIGS. 2A and 2B illustrate example wireless transmission path and reception path according to various embodiments of the disclosure.
Figure 2B:
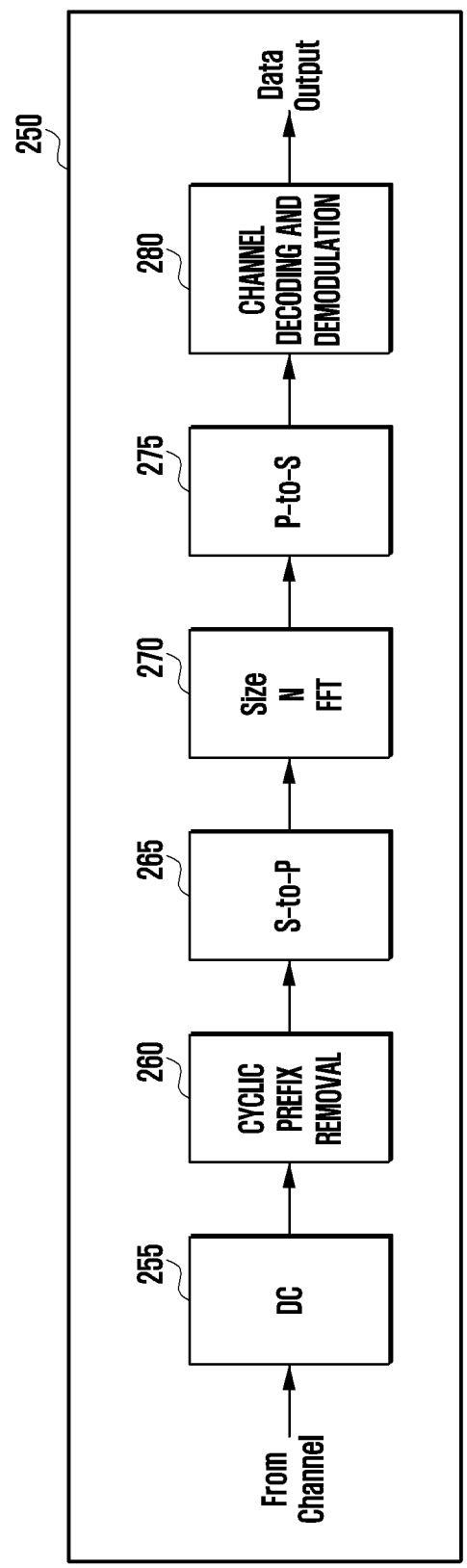

FIGS. 2A and 2B illustrate examples of wireless transmission and reception paths according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to a radio frequency (RF) frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
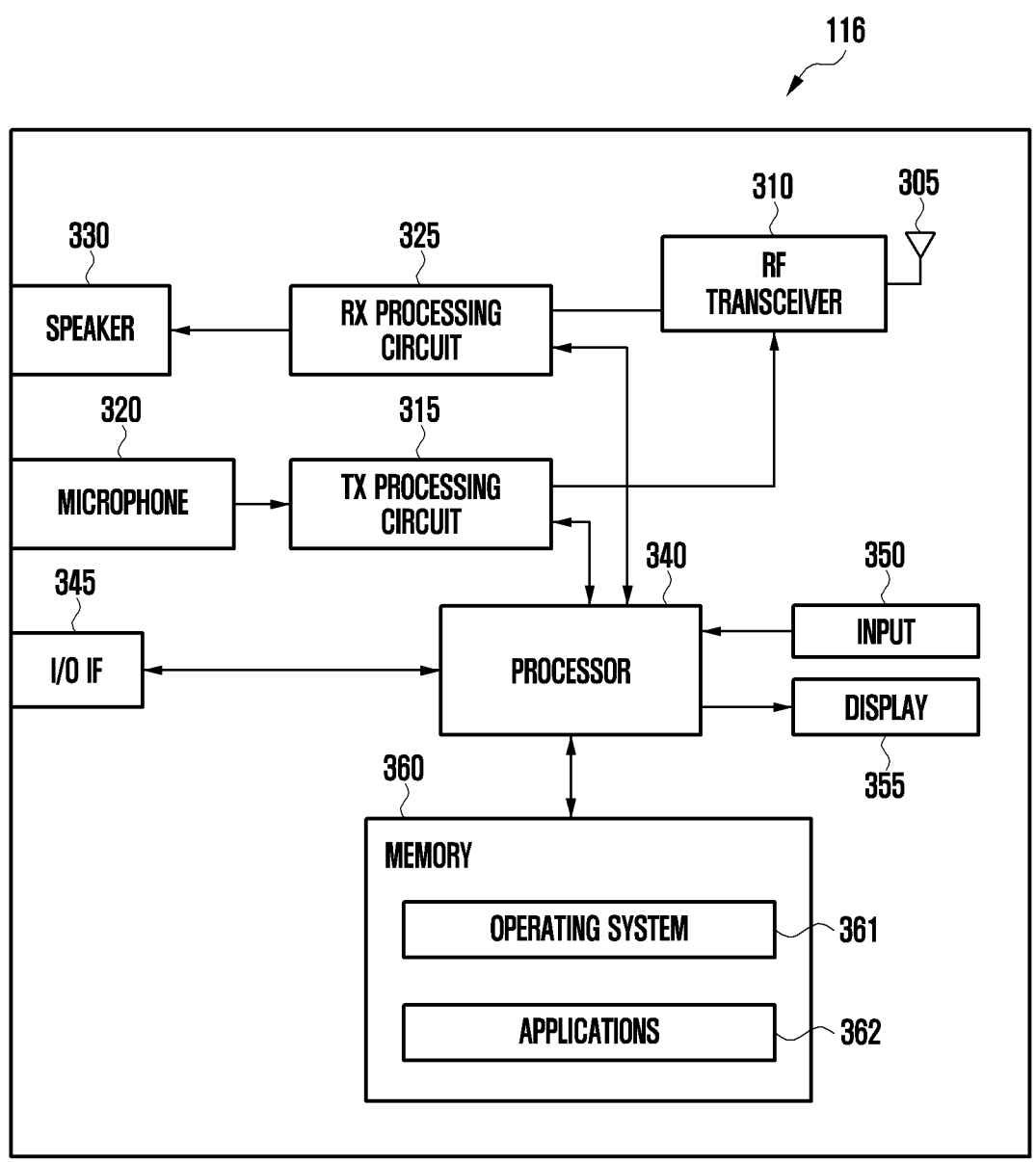
FIG. 3A illustrates an example user equipment according to an embodiment of the disclosure.

FIG. 3A illustrates an example UE 116 according to an embodiment of the disclosure.

Referring to FIG. 3A, the embodiment of UE 116 is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
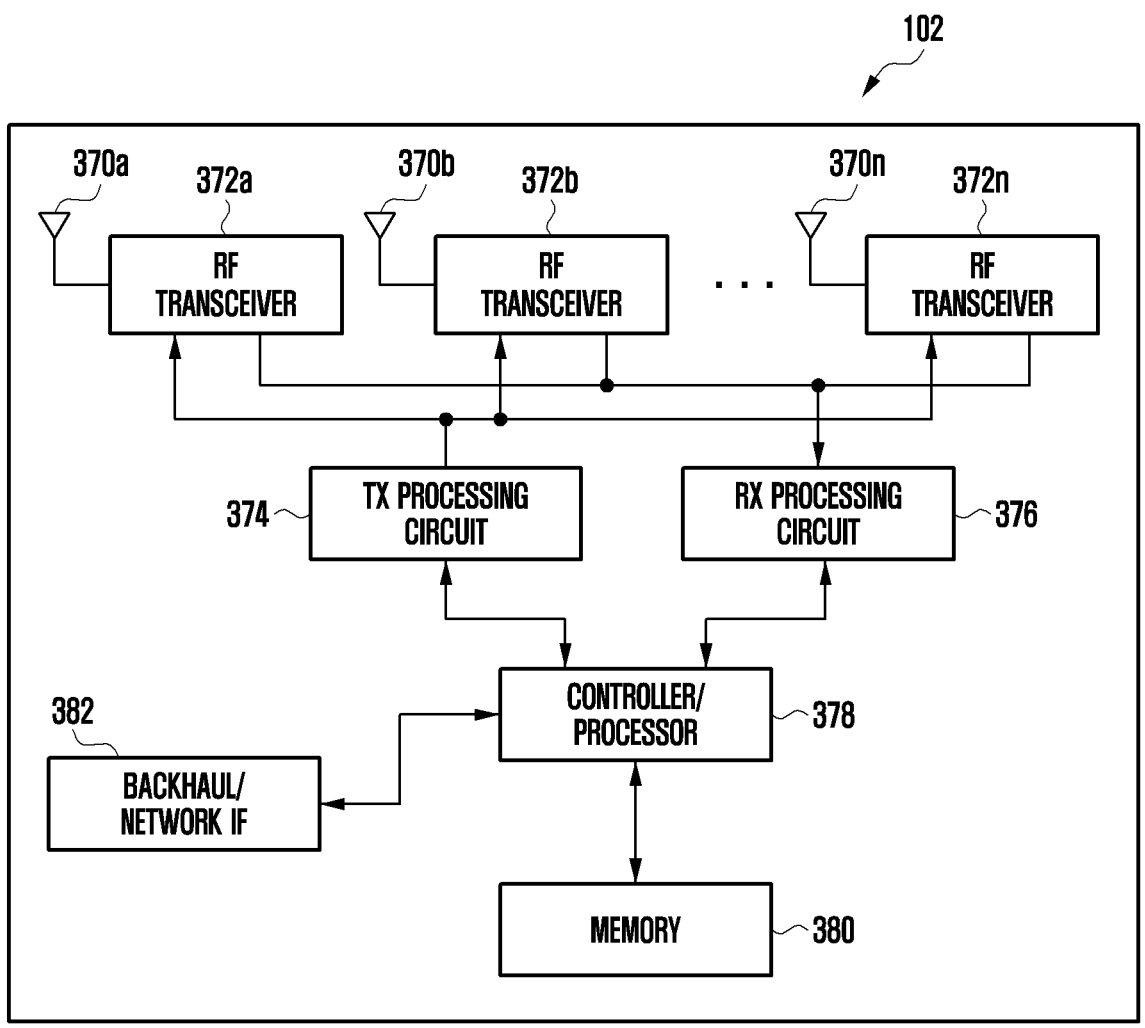
FIG. 3B illustrates an example base station according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a, 370b, . . . 370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a, 372b, . . . 372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The various embodiments of the disclosure are further described below with reference to the accompanying drawings.

The text and drawings are provided as examples only to help readers understand the disclosure. They are not intended and should not be construed as limiting the scope of the disclosure in any way. Although certain embodiments and examples have been provided, based on the content disclosed herein, it is apparent to those skilled in the art that changes can be made to the illustrated embodiments and examples without departing from the scope of the disclosure.

In a wireless communication system, before receiving a physical downlink shared channel (PDSCH), the UE needs to receive a physical downlink control channel (PDCCH) to obtain the scheduling information of the PDSCH, and after receiving the PDSCH according to the scheduling information, it needs to report hybrid automatic repeat request acknowledgment (HARQ-ACK) information bits to the base station. In addition, the UE may also report other uplink control information to the base station. UE can carry HARQ-ACK information bits or other uplink control information through PUCCH.

Figure 4:
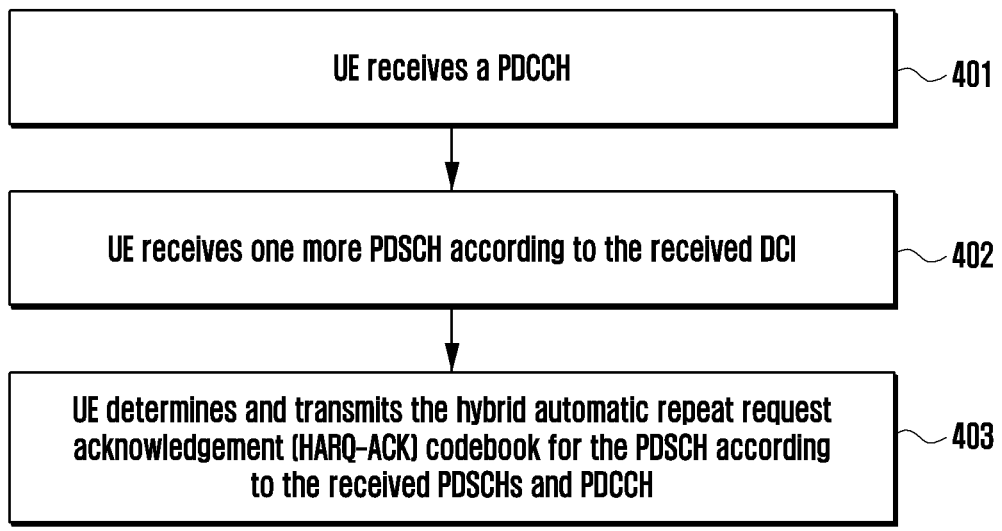
FIG. 4 illustrates a flowchart of a method of transmitting one or more physical downlink shared channels (PDSCHs) according to an embodiment of the disclosure.

FIG. 4 illustrates a flowchart of a method of transmitting one or more PDSCHs according to an embodiment of the disclosure. The method includes:

At operation 401: the UE receives a PDCCH. The received PDCCH may include downlink control information (DCI) for scheduling one or more PDSCHs.

At operation 402: the UE receives one or more PDSCHs according to the received DCI.

At operation 403: the UE determines and transmits a hybrid automatic repeat request acknowledgement (HARQ-ACK) codebook for the PDSCHs according to the received PDSCHs and PDCCH.

The DCI in operation 401 may schedule 1 or Np>1 PDSCH(s). The DCI may include the HARQ-ACK timing information. The HARQ-ACK timing information is the time delay from PDSCH to HARQ-ACK feedback, which is denoted as K1.

The HARQ-ACK of Np PDSCHs scheduled by one DCI may correspond to a same uplink time unit. Therefore, only one bit field for HARQ-ACK timing information is required in DCI. Taking the last PDSCH among the Np PDSCHs scheduled by the DCI as the time reference, the uplink time unit where HARQ-ACK is transmitted is determined according to K1. Preferably, the uplink time unit is an uplink slot or sub-slot.

The HARQ-ACK of Np PDSCHs scheduled by one DCI may correspond to one or more uplink time units.

The DCI also includes the time domain resource allocation information of Np PDSCHs. Generally, the base station configures the PDSCH time domain resource allocation (TDRA) table R for the UE to determine the possible time domain resources of a PDSCH. A row in the table R may indicate the time domain resource information of one or more PDSCHs. The time domain resource information includes at least one of the start symbol and symbol numbers (also called start and length indicator values (SLIV)) of the PDSCH, the slot (k0) where the PDSCH is located, and the PDSCH mapping type. For example, the base station configures the time domain resource allocation list of the PDSCH (corresponding to the PDSCH TDRA table R), for example, through PDSCH-TimeDomainResourceAllocationList (the time domain resource allocation list). PDSCH-TimedomainResourceAllocation list includes Ntdra elements, and each element corresponds to one row of the PDSCH TDRA table R. That is, the PDSCH TDRA table R includes Ntdra rows. One element in the PDSCH-TimedomainResourceAllocation list may include SLIV(s), PDSCH mapping type(s), and k0 of one or more PDSCHs. Accordingly, one row of the PDSCH TDRA table R may include SLIV(s), PDSCH mapping type(s) and k0 of one or more PDSCHs. Preferably, the number of PDSCHs (Np) included in one element in the PDSCH-TimedomainResourceAllocation list may not exceed Nmax. Preferably, when the number of PDSCHs included in one element in the PDSCH-TimedomainResourceAllocation list is greater than 1, each PDSCH in the element is indicated with a separate SLIV, PDSCH mapping type and kW. In a DCI, the time domain resources of Np PDSCHs scheduled by the DCI are indicated by indicating the row index of the PDSCH TDRA table R.

Preferably, if information for transmission of coded block groups (CBGs), such as CBG transmission information (CBGTI) and CBG flushing out information (CBGFI), is included in one DCI, then the bit fields are only applicable to the case that a DCI schedules one PDSCH. If a DCI schedules Np>1 PDSCHs, the information for transmission of CBG is not included, or the bit fields of the information for transmission of CBG are not applicable.

At operation 403, according to an implementation, the UE generates HARQ-ACK bits for each PDSCH respectively.

According to another implementation, the UE determines a PDSCH bundle according to predefined rules, and the UE generates HARQ-ACK bits for each PDSCH bundle respectively.

This disclosure focuses on descriptions of how to perform PDSCH bundle and HARQ-ACK feedback for PDSCHs, but it is also applicable to PUSCH bundle and HARQ-ACK indication for PUSCH.

One PDSCH bundle contains one or more PDSCH. The HARQ-ACK information bit of PDSCHs or PUSCHs within one bundle is processed in a predefined method to generate one HARQ-ACK information bit, and this operation is also called HARQ-ACK bundle. The predefined processing methods include at least one of the following: AND, logical AND, XOR, OR, and logical OR. Preferably, multiple PDSCHs or PUSCHs within one bundle are scheduled by a same DCI. Preferably, multiple PDSCHs or PUSCHs within one bundle are transmitted on a same bandwidth part (BWP) and are scheduled by a same DCI. Preferably, multiple PDSCHs or PUSCHs within one bundle are transmitted on a same BWP, occupy different time domain resources and are scheduled by a same DCI. The PDSCH bundle is also called HARQ-ACK bundle in time domain. Preferably, the HARQ-ACK information of one PDSCH bundle is 1 bit HARQ-ACK; or Nu_tb bits HARQ-ACK, wherein Nu_tb is the maximum number of transport blocks (TBs) that may be transported by one PDSCH configured by the base station; or Ncbg_max bits HARQ-ACK, wherein Ncbg_max is the maximum number of coding block groups (CBGs) that may be transported by one PDSCH.

Generally, when the channel environments that respective PDSCHs within a PDSCH bundle experience are relatively close, it is more likely that the decoding results of respective PDSCHs are the same, that is, it is highly likely that the HARQ-ACK of respective PDSCHs are NACK or ACK at the same time. By way of PDSCH bundles, the HARQ-ACK of respective PDSCHs within one bundle may be represented with fewer HARQ-ACK bits, which may achieve the effect of reducing the HARQ-ACK signaling overhead. It may also achieve the effect of reducing the DCI overhead, based on the specific DCI design.

Hereinafter, for the convenience of description, the description on operations of how to implement PDSCH bundle is conducted by taking the following case as an example: in which the predefined processing method is logical AND. The following description is also applicable to PUSCH, and other predefined processing methods.

Preferably, the UE does not expect to be configured with both PDSCH bundle and CBG-based transmission by the base station. Preferably, if both PDSCH bundle and CBG-based transmission are configured by the base station, the UE does not perform PDSCH bundle. Preferably, if both PDSCH bundle and CBG-based transmission are configured by the base station, the UE does not perform CBG-based transmission.

Preferably, when the logical AND operations are performed on the HARQ-ACK of respective PDSCHs within a PDSCH bundle, the logical AND is performed only on the HARQ-ACK of valid PDSCHs, that is, the HARQ-ACK of the invalid PDSCHs are not considered. Preferably, the invalid PDSCHs are PDSCHs the time domain resources of which collide with the semi-static uplink and/or downlink configuration. For example, at least one symbol of one PDSCH is determined as an uplink symbol according to TDD-UL-DL-configuration common or TDD-UL-DL-ConfigurationDedicated. Preferably, the invalid PDSCHs are PDSCHs the time domain resources of which collide with the uplink and/or downlink resources indicated by the slot format indication (SFI). Preferably, the invalid PDSCHs are PDSCHs that are canceled reception due to a collision with a specific signal. For example, if the time domain resources of a SPS PDSCH1 and a SPS PDSCH2 partially overlap, and the SPS configuration index of the SPS PDSCH1 is larger than that of the SPS PDSCH2, the SPS PDSCH1 is an invalid SPS PDSCH. Or, if the time domain resources of a SPS PDSCH1 and a SPS PDSCH2 partially overlap, and the priority index of the SPS PDSCH1 is less than that of the SPS PDSCH2, the SPS PDSCH1 is an invalid SPS PDSCH. For example, if there are four PDSCHs in a PDSCH bundle, wherein PDSCH1~3 are valid PDSCHs and the HARQ-ACK are ACK, ACK, and ACK, while PDSCH4 is an invalid PDSCH, then the HARQ-ACK of this PDSCH bundle is the logical AND on the HARQ-ACK of PDSCH 1~3, thus it is ACK.

According to an aspect of the disclosure, in order to determine the number of PDSCH bundles corresponding to PDSCHs scheduled by one DCI and the number of PDSCHs in the PDSCH bundle, the disclosure proposes the following methods:

Method 1: the number of PDSCHs in a PDSCH bundle configured by the base station is Npb, and the UE determines the number of PDSCH bundles corresponding to the PDSCHs scheduled by DCI and the number of PDSCHs in a PDSCH bundle according to the number of PDSCHs scheduled by the received DCI and the number of PDSCHs configured by the base station.

Preferably, the base station configures the name binding protocol (Npb) through higher layer signaling, e.g., radio resource control (RRC) signaling. Or, the base station configures the Npb through media access control (MAC) signaling or physical layer signaling, e.g., DCI.

The Np PDSCHs scheduled by one DCI may be divided into Nb bundles, wherein Nb≥1. For example, Nb=ceil(Np/Npb).

Figure 5:
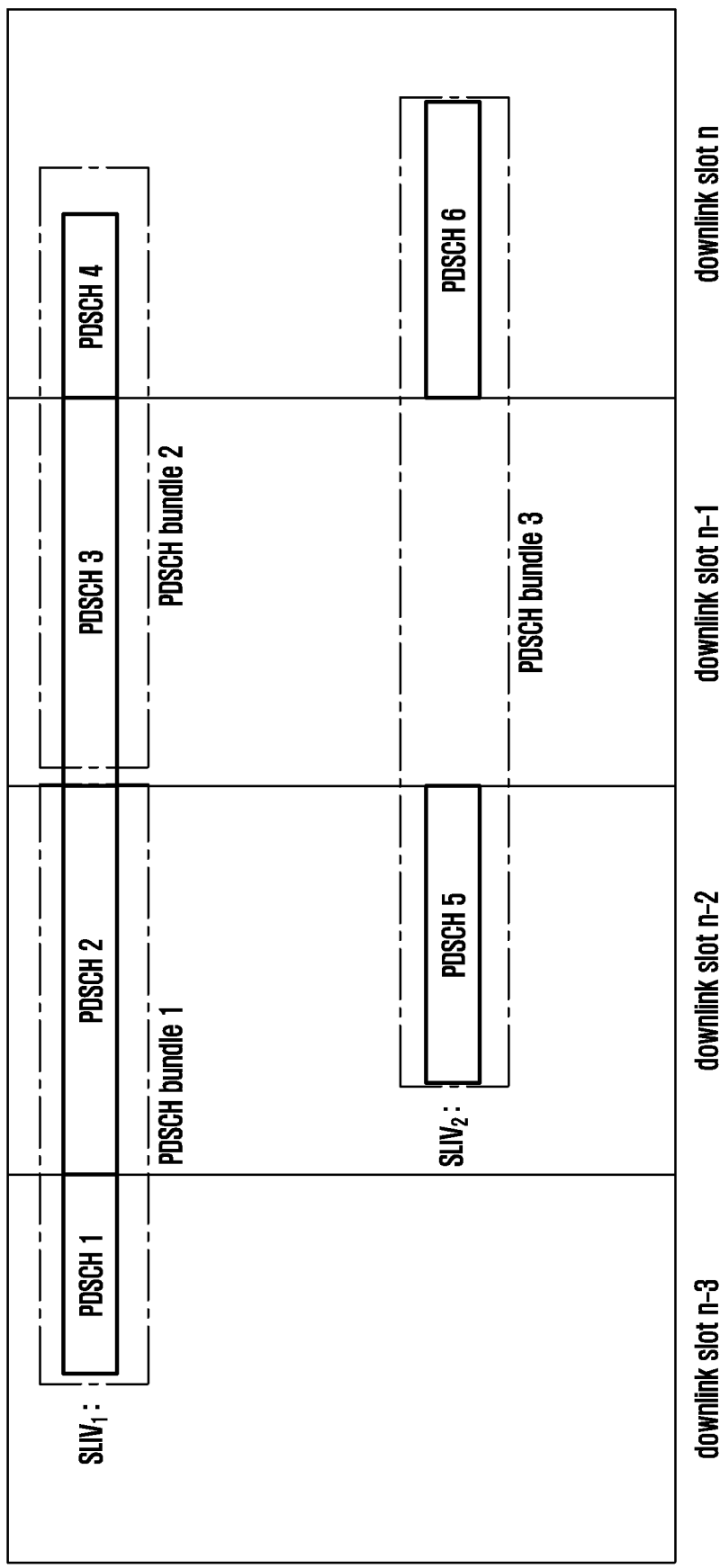
FIG. 5 illustrates a PDSCH time domain resource allocation (TDRA) table R according to an embodiment of the disclosure.

FIG. 5 illustrates a PDSCH TDRA table R according to an embodiment of the disclosure.

Referring to FIG. 5, one DCI may schedule four PDSCHs, PDSCH 1~4, and the time domain resource is denoted by SLIV1; and one DCI may schedule two PDSCHs, PDSCH 5~6, and the time domain resource is denoted by SLIV2. Npb configured by the higher layer is equal to 2. Then the four PDSCHs corresponding to SLIV1 may be divided into two PDSCH bundles (PDSCH bundle 1 and PDSCH bundle 2), and the PDSCH bundle includes two PDSCHs. The two PDSCHs corresponding to SLIV2 may be divided into one PDSCH bundle (PDSCH bundle 3), and the PDSCH bundle includes two PDSCHs.

The base station may select a suitable Npb, according to the time domain resources and channel environment of the PDSCH, to achieve the compromise between the effectiveness and the feedback overhead of HARQ-ACK.

Preferably, the base station separately configures Npb for: respective DCIs format for scheduling PDSCH transmission, or DCI located in different Search Space for scheduling PDSCH transmission, or respective TDRA tables for scheduling PDSCH transmission, or respective downlink cells, or respective downlink BWPs, or respective downlink subcarrier spacing (SCS).

Preferably, the base station separately configures Npb for respective uplink BWP, or respective uplink cell, or respective uplink SCS, or respective PUCCH group. Thus, for different downlink cells, the number of PDSCH bundles corresponding to the PDSCHs scheduled by one DCI is the same.

Preferably, the base station configures one Npb for one UE, and the Npb has the same value for any UL cell/BWP of the UE or any DL cell/BWP of the UE.

Preferably, for different types of HARQ-ACK codebook, the method of configuring the number of PDSCHs in a PDSCH bundle may be different. For example, for a semi-static codebook, the base station separately configures Npb for each downlink BWP, and for a dynamic codebook, the base station configures one Npb for one UE.

Preferably, the Npb only calculates the number of resources for valid PDSCHs. For example, one DCI schedules 6 PDSCH, Npb=2, wherein the time domain resources of PDSCH 4 and PDSCH 6 collide with the semi-static uplink and/or downlink configuration. For example, if according to TDD-UL-DL-ConfigurationCommon or TDD-UL-DL-configurationDedicated, PDSCH 4 and PDSCH 6 are determined as the uplink symbol, then they do not belong to any PDSCH bundle, and the PDSCH bundle is determined only according to PSDCH 1~3 and PDSCH 5. That is, the first PDSCH bundle includes PDSCHs 1~2, and the second PDSCH bundle includes PDSCH 3 and PDSCH 5.

Method 2: The base station configures the bundle number Nb corresponding to one DCI (or the number of HARQ-ACK bits corresponding to one DCI), and according to the number of PDSCHs scheduled by the received DCI and the number of bundles corresponding to one DCI configured by the base station (or the number of HARQ-ACK bits corresponding to one DCI), the UE determines the number of PDSCH bundles corresponding to the PDSCH scheduled by the DCI and the number of PDSCHs Npb in a PDSCH bundle.

Preferably, the base station configures the Nb through higher layer signaling, e.g., RRC signaling. Or, the base station configures the Nb through media access control (MAC) signaling or physical layer (PHY) signaling, e.g., DCI.

Figure 6:
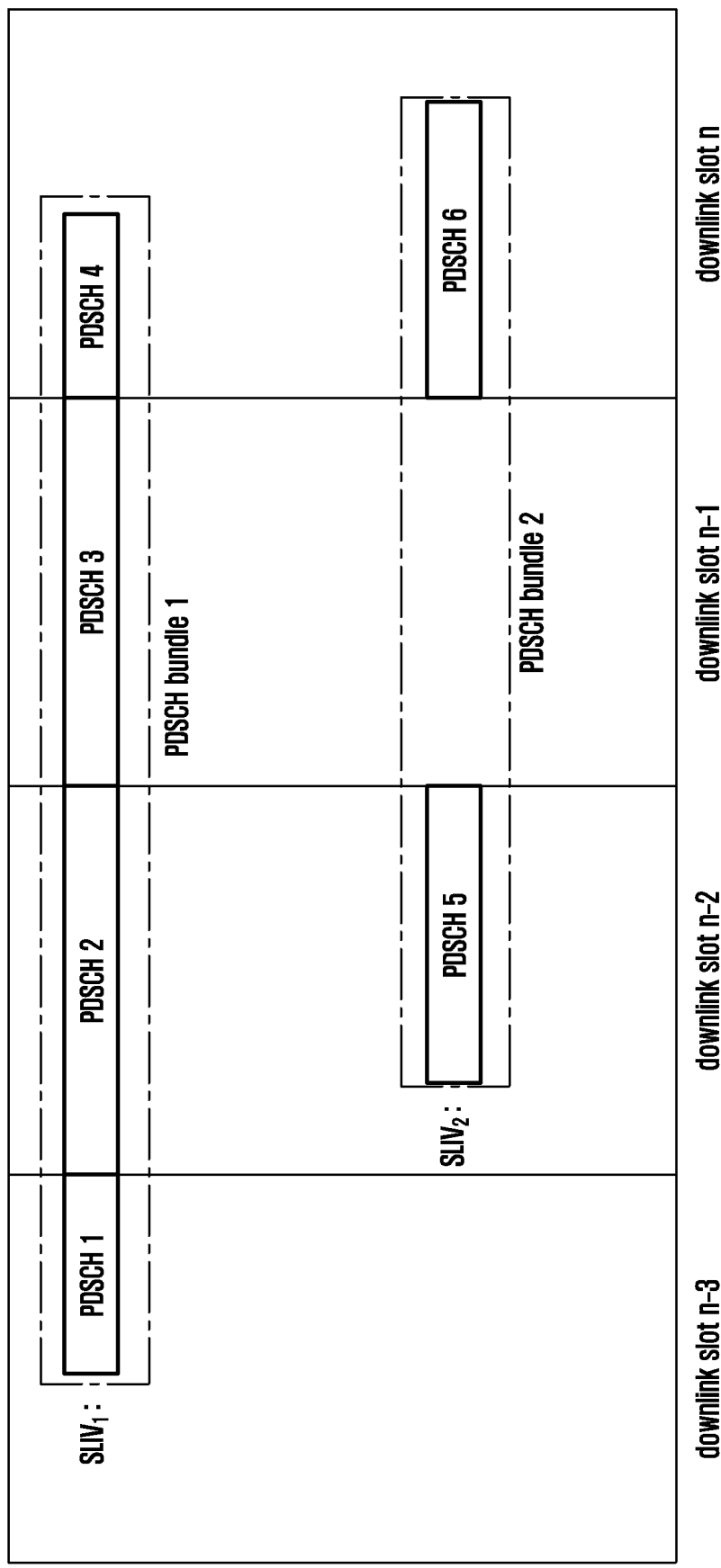
FIG. 6 illustrates a PDSCH TDRA table R according to an embodiment of the disclosure.

FIG. 6 illustrates a PDSCH TDRA table R according to an embodiment of the disclosure.

Referring to FIG. 6, one DCI may schedule four PDSCHs, PDSCH 1~4, and the time domain resource is denoted by SLIV1; and one DCI may schedule two PDSCHs, PDSCH 5~6, and the time domain resource is denoted by SLIV2. Nb configured by the higher layer is equal to 1. The four PDSCHs corresponding to SLIV1 can be divided into one PDSCH bundle (PDSCH bundle 1), and the PDSCH bundle includes four PDSCHs. The two PDSCHs corresponding to SLIV2 can be divided into one PDSCH bundle (PDSCH bundle 2), and the PDSCH bundle includes two PDSCHs.

If the number of PDSCHs actually scheduled by one DCI is Np<NB, Np valid HARQ-ACK bits are transmitted, HARQ-ACK is generated according to decoding results of Np PDSCHs, and Nb−Np placeholder bits are transmitted, e.g., Nb−Np NACKs are transmitted.

Preferably, the base station separately configures Nb for: respective DCIs format for scheduling PDSCH transmission, or DCI located in different Search Space for scheduling PDSCH transmission, or respective TDRA tables for scheduling PDSCH transmission, or respective downlink cells, or respective downlink BWPs, or respective downlink subcarrier spacings (SCS).

Preferably, the base station separately configures Nb per uplink BWP, or per uplink cell, or per uplink SCS, or per PUCCH group.

Preferably, the base station configures one Nb for one UE, and Nb has the same value for any UL cell/BWP of the UE or any DL cells/BWP of the UE.

Preferably, for different types of HARQ-ACK codebook, the method of configuring the number of PDSCHs in a PDSCH bundle may be different. For example, for semi-static codebook, the base station separately configures Nb per downlink BWP, and for a dynamic codebook, the base station configures one Nb per UE.

The base station may select a suitable Nb, according to the time domain resources and channel environment of the PDSCH, to achieve the compromise between the effectiveness and the feedback overhead of HARQ-ACK Furthermore, because the number of bundles corresponding to one DCI is constant, the design of HARQ-ACK codebook can be simplified and the overhead of downlink assignment indexes (DAI) in DCI can be reduced.

Method 3: The base station configures the maximum time length of one PDSCH bundle, and the UE determines the number of PDSCH bundles (Nb) corresponding to PDSCHs scheduled by one DCI and the number of PDSCH (Npb) in a PDSCH bundle according to the intervals between time domain resources of respective PDSCHs scheduled by the received DCI and the maximum time length configured by the base station.

Preferably, the base station configures the maximum time length of one PDSCH bundle through higher layer signaling, e.g., RRC signaling. Or, the base station configures the maximum time length of one PDSCH bundle through MAC signaling or physical layer signaling, e.g., DCI.

Preferably, the maximum time length of one bundle is in the units of: symbols, or slots, or symbols of a reference SCS, or absolute time (e.g., milliseconds).

Figure 7:
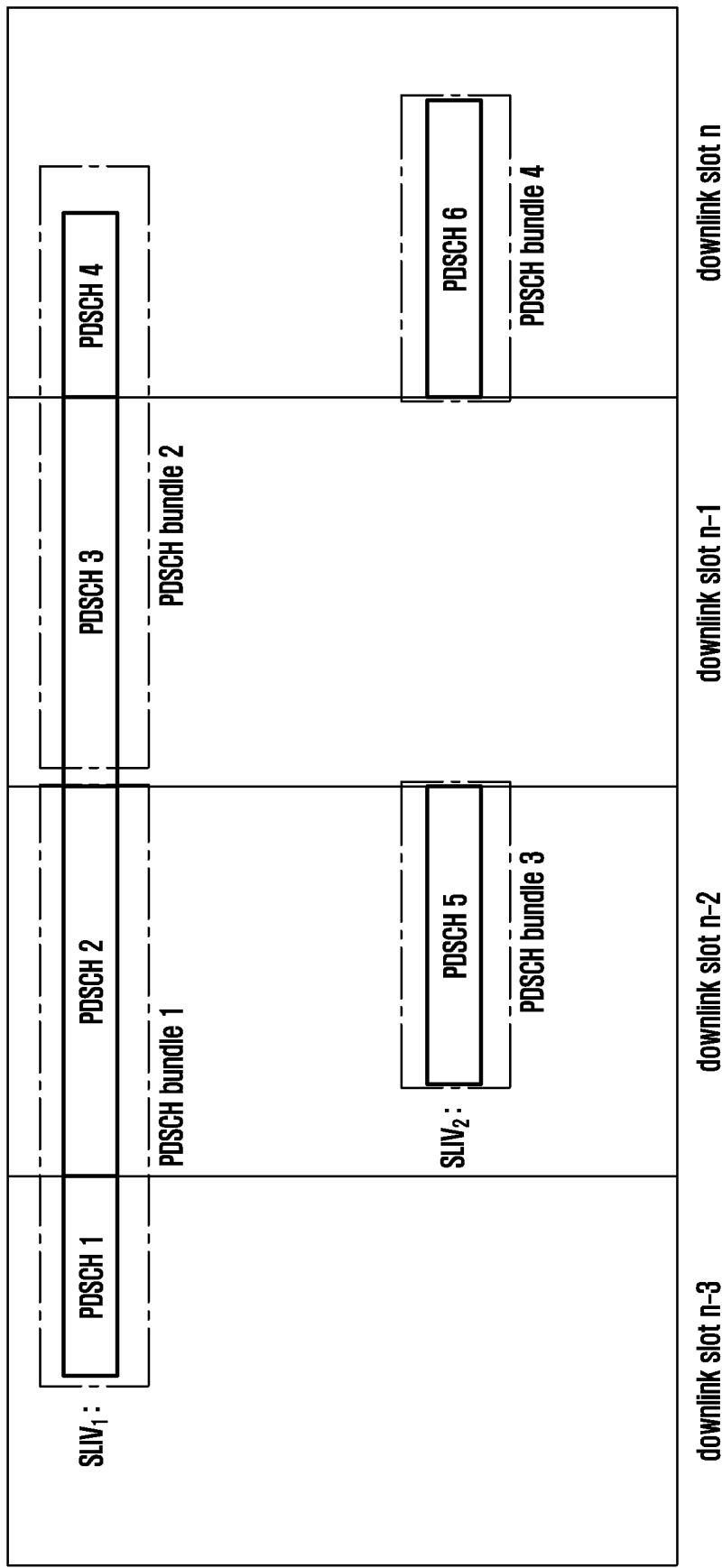
FIG. 7 illustrates a PDSCH TDRA table R according to an embodiment of the disclosure.

FIG. 7 illustrates a PDSCH TDRA table R according to an embodiment of the disclosure.

Referring to FIG. 7, one DCI may schedule four PDSCHs, PDSCH 1~4, and the time domain resource is denoted by SLIV1; and one DCI may schedule two PDSCHs, PDSCH 5~6, and the time domain resource is denoted by SLIV2. The maximum time length of one bundle configured by the higher layer is 2 slots. The four PDSCHs corresponding to SLIV1 can be divided into two PDSCH bundles (PDSCH bundle 1 and PDSCH bundle 2), and the time length of each PDSCH bundle does not exceed two slots, and the PDSCH bundle includes two PDSCH bundles. The two PDSCHs corresponding to SLIV2 can be divided into two PDSCH bundles (PDSCH bundle 3 and PDSCH bundle 4), because the interval between the start symbol of PDSCH 5 and the end symbol of PDSCH6 exceeds two slots, and these two PDSCHs belong to two different PDSCH bundles respectively.

Preferably, the base station separately configures the maximum time length of one bundle for: respective DCIs format for scheduling PDSCH transmission, or DCI located in different Search Space for scheduling PDSCH transmission, or respective TDRA tables for scheduling PDSCH transmission, or respective downlink cells, or respective downlink BWPs, or respective downlink subcarrier spacing (SCS).

Preferably, the base station separately configures the maximum time length of one bundle for: respective uplink BWP, or respective uplink cell, or respective uplink SCS, or respective PUCCH group.

Preferably, the base station configures one maximum time length of one bundle for one UE, and the maximum time length has the same value for any UL cell/BWP of the UE or any DL cell/BWP of the UE.

Preferably, for different HARQ-ACK codebooks, the base station can separately configure the maximum time length of one bundle. When multiple PDSCHs scheduled by one DCI are unevenly distributed in time (for example, one DCI schedules 8 PDSCH, wherein PDSCHs 1~3 are in slot 1, PDSCHs 4~6 are in slot 2, 3, 4, and PDSCHs 7~8 are in slot 7, 8 respectively), if the numbers of bundles in each PDSCH are the same (for example, if bundle 1 includes PDSCHs 1~4 and bundle 2 includes PDSCHs 5~8), then the time length of bundle1 is 2 slots and the time length of bundle 2 is 6 slots. The respective PDSCHs in bundle 2 experience great channel changes and the possibility that HARQ-ACK of respective PDSCHs are different increases, which leads to that the logical AND of HARQ-ACK of PDSCHs in bundle 2 cannot reflect the HARQ-ACK of respective PDSCHs well. If the number of bundles and the number of PDSCHs within one bundle are determined according to the time length of one bundle, the channels experienced by PDSCHs within respective bundles can be basically the same, and the effectiveness of HARQ-ACK feedback can be improved.

Based on at least one of the above methods, when the number of PDSCH bundle Nb is greater than 1, according to an implementation, the number of PDSCHs in each bundle of the 1st~(Nb−1)th bundles is fixed as Npb, and the number of PDSCN in the PDSCH of the Nb-th bundle is Np−(Nb−1)*Npb. For example, according to method 1, it is assumed that the higher layer configures that the number of PDSCHs in a PDSCH bundle is Npb=3, and Np=7 PDSCHs is scheduled by one DCI. Then, the number of PDSCH bundle this DCI schedule is Nb=ceil (Np/Npb)=3, wherein, each of the first two PDSCH bundles includes 3 PDSCHs, and the third PDSCH bundle includes one PDSCH.

According to another implementation, try to make the number of PDSCHs in each bundle equal. The number of PDSCHs in each bundle Npb=floor(Np/Nb), or Npb=ceil (Np/Nb), or Npb=(Np/Nb). For example, according to method 1, it is assumed that the higher layer configures that the number of PDSCHs in a PDSCH bundle is Npb=3, and Np=7 PDSCHs is scheduled by one DCI. Then, the number of PDSCH bundle this DCI schedule is Nb=ceil (Np/Npb) =3, wherein, the first PDSCH bundle includes Npb=ceil (Np/Nb)=3 PDSCHs, and the second and third PDSCH bundles include 2 PDSCH respectively. For example, according to method 2, it is assumed that the higher layer configures that the number of PDSCH bundles corresponding to one DCI is Nb=3, and Np=7 PDSCHs is scheduled by one DCI. Then, the first PDSCH bundle includes Npb=ceil (Np/Nb)=3 PDSCHs, and the second and third PDSCH bundle include 2 PDSCHs respectively.

Based on at least one of the above methods, the number of PDSCHs in each bundle is determined according to the interval between the time domain resources of respective PDSCHs respectively, so that the time interval from the first PDSCH to the last PDSCH in one bundle does not exceed the maximum time length of one bundle. The time interval from the first PDSCH to the last PDSCH is the time interval from the start of the first PDSCH to the end of the last PDSCH, or the time interval from the end of the first PDSCH to the end of the last PDSCH, or the time interval from the start of the first PDSCH to the start of the last PDSCH. It is assumed that the maximum time length of one bundle is 4 slots, and 8 PDSCHs are scheduled by one DCI, wherein PDSCHs 1~3 are in slot 1, PDSCHs 4~6 are in slots 2, 3 and 4 respectively, and PDSCHs 7~8 are in slots 7 and 8 respectively. Then, bundle 1 includes PDSCHs 1~6, and bundle 2 includes PDSCHs 7, 8.

According to an implementation, the base station configures the maximum numbers of PDSCH bundles (Nb_max) corresponding to one DCI. By controlling Nb_max, the effect of controlling the number of HARQ-ACK feedback bits can be achieved. Based on method 1 or 3, if Nb>Nb_max, NB is reduced to NB_max according to a predefined method. For example, Nb_max to Nb-Nb_max bundles are formed as one bundle. Or, Nb bundles are divided into Nb_max bundles as evenly as possible.

Preferably, for different HARQ-ACK codebooks or different types of HARQ-ACK codebook, the method of configuring a bundle of PDSCH can be different. For example, for a semi-static codebook, the base station configures the number of PDSCH bundle (Nb), and for a dynamic codebook, the base station configures the maximum time length of one bundle.

According to another aspect of this application, a method of implementing PDSCH bundle in a dynamic codebook is proposed.

A dynamic codebook is also known as Type-2 HARQ-ACK codebook, and they can be used interchangeably in this application.

At operation 103, the UE determines the HARQ-ACK codebook for PDSCH according to the received PDSCHs and PDCCH. For the HARQ-ACK transmitted in an uplink time unit n, the UE needs to determine the size of the HARQ-ACK codebook and the position for placing the HARQ-ACK of respective PDSCHs in the codebook according to K1 and the downlink assignment index (DAI).

If the base station configures a dynamic codebook for the UE, the DCI includes the downlink assignment index (DAI). The DAI comprises a first DAI and/or a second DAI. The first DAI is used to indicate one of the following: information on the sum of the number of scheduled PDSCHs up to the current serving cell and current PDCCH monitoring occasion; information on the sum of the number of scheduled PDSCH groups up to the current serving cell and current PDCCH monitoring occasion; information on the sum of the number of scheduled PDSCH bundles up to the current serving cell and current PDCCH monitoring occasion (PDCCH MO); information on the sum of the number of scheduled PDSCH bundle groups up to the current serving cell and current PDCCH monitoring occasion; information on the sum of the number of PDCCHs (DCI) up to the current serving cell and current PDCCH monitoring occasion, in a HARQ-ACK codebook or sub-codebook. Preferably, the PDSCH group includes a plurality of PDSCHs, for example, one PDSCH group includes Mp PDSCHs. Preferably, the PDSCH bundle group includes a plurality of PDSCH bundles, for example, one PDSCH bundle group includes Mp PDSCH bundles. Mp is configured by base station. The second DAI is used to indicate one of the following: information on the sum of the number of scheduled PDSCHs up to the current PDCCH monitoring occasion; information on the sum of the number of scheduled PDSCH groups up to the current PDCCH monitoring occasion; information on the sum of the number of scheduled PDSCH bundles up to the current PDCCH monitoring occasion; information on the sum of the number of scheduled PDSCH bundle groups up to the current PDCCH monitoring occasion; information on the sum of the number of PDCCHs up to the current PDCCH monitoring occasion, in a HARQ-ACK codebook or sub-codebook. Besides, in a DCI for scheduling a PUSCH, the third DAI is included, which is used to indicate one of the following: information on the sum of the number of PDCCHs corresponding to HARQ-ACK fed back on the PUSCH; information on the sum of the number of PDSCHs corresponding to HARQ-ACK fed back on the PUSCH; information on the sum of the number of PDSCH groups corresponding to HARQ-ACK fed back on the PUSCH; information on sum of the number of PDSCH bundles corresponding to HARQ-ACK fed back on the PUSCH; information on the sum of the number of PDSCH bundle groups corresponding to HARQ-ACK fed back on the PUSCH. Generally, the first DAI is called C-DAI (counter DAI), the second DAI is called T-DAI (Total DAI), and the third DAI is called UL DAI.

Preferably, one HARQ-ACK dynamic codebook consists of one sub-codebook. Preferably, one HARQ-ACK dynamic codebook consists of at least two sub-codebooks. The number of DAI are all in the same HARQ-ACK sub-codebook. Preferably, the rules for counting DAI in DCI belonging to the same HARQ-ACK codebook are the same.

If the number of PDSCH bundles corresponding to a DCI is variable, how to avoid the uncertainty of the number of HARQ-ACK to be fed back caused by UE's misdetection on DCI should be considered when generating dynamic codebook. For example, determining the number of PDSCH bundles according to method 1 or method 3 of PDSCH bundles depends on the number of PDSCH (Np) scheduled by one DCI or the interval between time domain resources of PDSCHs scheduled by one DCI, so the number of HARQ-ACK bits corresponding to one DCI is variable. For another example, determining the number of PDSCH bundles according to method 2 of PDSCH bundles depends on the number of bundles (Nb) corresponding to one DCI configured by the base station. If the base station separately configures Nb for different DCIs, different cells, or different BWP configurations, the number of HARQ-ACK bits corresponding to respective DCIs that feedback HARQ-ACK in the same PUCCH is variable. If DAI is counted according to the number of DCIs, for one HARQ-ACK sub-codebook, UE receives DCI1 indicating C-DAI=1 and UE receives DCI3 indicating C-DAI=3, thus UE can find misdetection of one DCI according to C-DAI=1 and C-DAI=3. However, UE cannot determine the number of PDSCH bundles corresponding to the misdetected DCI, thus the number of HARQ-ACK fed back cannot be determined.

To solve the above problems, a dynamic codebook is generated according to at least one of the following:

(a) if the dynamic codebook consists of X(X>1) sub-codebooks, UE determines a sub-codebook, in which the HARQ-ACK of PDSCHs scheduled by one DCI is located, according to whether the number of HARQ-ACK bits corresponding to one DCI exceeds a predefined threshold. If a PDSCH bundle is configured by the base station, the condition for determining a sub-codebook in which the HARQ-ACK of a PDSCH scheduled by one DCI is located is converted from according to whether the number of the HARQ-ACK bits corresponding to one DCI exceeds a predefined threshold to according to whether the number of PDSCH bundles scheduled by one DCI exceeds a predefined threshold $T_{bun}$. As for the number of HARQ-ACK bits corresponding to a sub-codebook, the bits to be fed back are determines according to the maximum number of bundles corresponding to the sub-codebook.

The number of DAI is counted based on DCI. For example, every time the UE receives a DCI, the number of DAI is increased by 1.

Preferably, X=2. The first sub-codebook consists of HARQ-ACK of at least one of the following types of PDSCH or PDCCH:

(1) HARQ-ACK of one PDSCH, if the PDSCH reception is TB based PDSCH reception, the PDSCH is scheduled by one PDCCH which schedules Np PDSCHs including this PDSCH, and Np≤Y, or NP*Nu_tb≤Y.

Wherein, y is a value configured by the base station or predefined by standards. For example, Y=1 or Y=2.

(2) HARQ-ACK of a PDSCH, if the PDSCH is SPS PDSCH;

(3) HARQ-ACK of a PDCCH, if the PDCCH is a PDCCH indicating SPS PDSCH release, or a PDCCH indicating Scell dormancy.

(4) HARQ-ACK of a PDSCH, if the PDSCH is scheduled by a PDCCH scheduling Np PDSCHs including this PDSCH and the Np PDSCHs are grouped into Nb PDSCH bundle(s) where Nb≤$T_{bun}$.

Preferably, according to method 2, Nb may be larger than Np. For the convenience of description, this case is also collectively referred to as Np PDSCHs forming Nb PDSCH bundles.

Preferably, the predefined threshold of the number of bundles is equal to 1 ($T_{bun}$=1). Preferably, the predefined threshold of the number of bundles is equal to 2 ($T_{bun}$=2). Preferably, the threshold $T_{bun}$ is configured by the base station.

Preferably, if the base station configures that on one BWP on at least one cell, one PDSCH can transmit up to Nu_tb (Nu_tb>1) TBs, for example, Nu_tb=2, then the threshold $T_{bun}$=Nu_tb. Preferably, if one PDSCH on all cells within one PUCCH group transmits at most one TB, the threshold $T_{bun}$=1.

The total number of bits of the first sub-codebook is $DAI_{g1}$*N1, and $DAI_{g1}$ is DAI in PDCCH corresponding to the sub-codebook. N1 is the number of HARQ-ACK bits corresponding to each DAI of the sub-codebook, for example, N1=Y.

Preferably, if the base station configures that on one BWP on at least one cell, one PDSCH can transmit up to Nu_tb TBs, for example, Nu_tb=2, then N1=Nu_tb.

Preferably, if the base station configures that on one BWP on at least one cell, one PDSCH can transmit up to Nu_tb TBs, for example, Nu_tb=2, Nu_tb bit HARQ-ACK is generated for Nb PDSCH bundles to which the PDSCH belonging to the first sub-codebook belongs. According to an implementation, if one PDCCH schedules Np PDSCHs, and Np PDSCHs form one PDSCH bundle, 1-bit HARQ-ACK is generated according to the logical AND of HARQ-ACK of Np PDSCHs, and 1-bit NACK is generated. Or, 2-bit HARQ-ACK is generated for Np PDSCHs, which are corresponding to the first Np1 PDSCHs and the last Np−Np1 PDSCHs among the Np PDSCHs respectively. For example, one DCI schedules 4 PDSCHs, and Nb=1 is determined according to PDSCH bundle mode 1 or 3, thus they belong to the first sub-codebook. The first two PDSCHs generate 1-bit HARQ-ACK, and the last two PDSCHs generate 1-bit HARQ-ACK.

The second sub-codebook consists of HARQ-ACK of at least one of the following types of PDSCH or PDCCH:

(1) HARQ-ACK of a PDSCH, if the PDSCH is scheduled by a PDCCH scheduling Np (Np>X) PDSCHs, and Np PDSCHs are grouped into Nb PDSCH bundle(s), where Nb>$T_{bun}$. Preferably, X=Y.

The number of HARQ-ACK bits of the second sub-codebook is determined by $DAI_{g2}$ and N2 of a PDCCH scheduling PDSCHs belonging to this sub-codebook. N2 is the number of HARQ-ACK bits corresponding to each DAI of the sub-codebook, for example, N2 is determined by Nb_max. Wherein Nb_max is configured by the base station, or Nb_max is determined according to the maximum number of PDSCH bundles which can be scheduled by one or more DCI on one or more cells. For example, the base station configures one cell and two DCI formats for the UE, wherein the largest PDSCH bundle in the PDSCH resource set which can be indicated by the time domain resource allocation (TDRA) in DCI format 1 is 2, and the largest PDSCH bundle in the PDSCH resource set which can be indicated by the time domain resource allocation (TDRA) in DCI format 2 is 3, then NB_max=3. For example, if $DAI_{g2}$=2, then the number of HARQ-ACK bits of the second sub-codebook is $DAI_{g2}$*Nb_max=6 bits.

Preferably, if the base station configures CBG-based transmission for the UE, the second sub-codebook further includes:

(2) HARQ-ACK of one PDSCH, if the reception of this PDSCH is CBG based PDSCH reception.

The number of HARQ-ACK bits of the second sub-codebook is determined by at least one of the following: the DAI of PDCCH for PDSCH belonging to this codebook, and the maximum value between Nb_max and configured maximum CBG number (Ncbg_max) (if it is 2 TBs, the maximum CBG number is the sum of CBG numbers of 2 TBs). For example, the number of HARQ-ACK bits of the second sub-codebook is DAI*max(Nb_max, Ncbg_max).

Preferably, when max(Nb_max, Ncbg_max)>Nb_max, the UE sets Nb_max to Ncbg_max. For example, if the NCBG_max configured by the base station is 8 and the NB_max configured by the base station is 4, then NB_max=Ncbg_max=8. According to Nb_max=8, UE performs PDSCH bundle on Np PDSCHs scheduled by one DCI.

Preferably, when Ncbg_max≥X2, the UE does not perform the PDSCH bundle, that is, the UE independently feeds back the HARQ-ACK of this PDSCH for each PDSCH. For example, X2=8, and for another example, X2=Np_max (the maximum number of PDSCHs that can be scheduled by DCI. HARQ-ACK of a PDSCH, if this PDSCH is scheduled by a PDCCH scheduling Np (Np>X) PDSCHs, then this PDSCH belongs to the second HARQ-ACK sub-codebook.

Preferably, when Ncbg_max≥X2, the UE does not expect the base station to configure PDSCH bundle.

Preferably, when the HARQ-ACK codebook consists of the second sub-codebook, and Ncbg_max>Np_max, the UE does not perform the PDSCH bundle. HARQ-ACK of one PDSCH, if this PDSCH is scheduled by a PDCCH scheduling Np (Np>X) PDSCHs, then this PDSCH belongs to the second HARQ-ACK sub-codebook.

Preferably, when the HARQ-ACK codebook only includes the first sub-codebook, and Ncbg_max>Np_max (the maximum number of PDSCHs that can be scheduled by one DCI, the UE performs the PDSCH bundle.

Preferably, the rules for counting DAI in DCIs belonging to the same HARQ-ACK codebook are the same. The DAI in DCIs in the first sub-codebook and the DAI in DCIs in the second sub-codebook have the same rules for counting, for example, counting according to DCI.

Preferably, the rules for counting DAI in DCI belonging to the same HARQ-ACK sub-codebook are the same. For example, DAI in DCIs in the first sub-codebook are all counted according to the number of PDCCHs (DCIs). DAI in DCIs in the second sub-codebook are all counted according to the number of PDSCH bundles.

Preferably, the rules for counting DCI scheduling Np>1 PDSCHs are the same. The rules for counting DAI in DCIs scheduling Np>1 PDSCHs and for counting DAI in DCIs scheduling Np=1 PDSCH are different. For example, DAI in DCIs scheduling Np>1 PDSCHs is counted according to PDSCH bundle, and DAI in DCIs scheduling Np=1 PDSCH is counted according to DCI.

Figure 8:
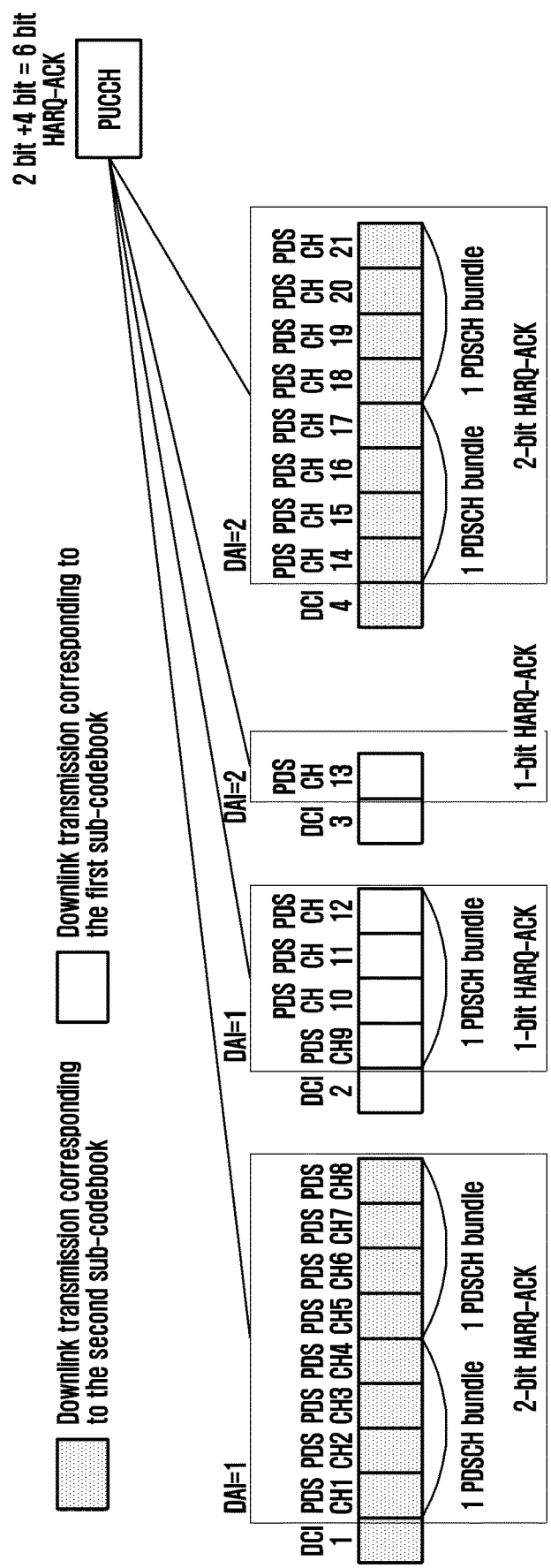
FIG. 8 illustrates an example in which the downlink assignment indexes (DAIs) of two hybrid automatic repeat request acknowledgment (HARQ-ACK) sub-codebooks are both counted according to an embodiment of the disclosure.

FIG. 8 illustrates an example in which the DAIs of two HARQ-ACK sub-codebooks are both counted according to an embodiment of the disclosure. One PDSCH on each cell in one PUCCH group can transmit one TB at most, $T_{bun}=1$, that is, PDSCHs with Nb>1 belong to the second sub-codebook, and other PDSCHs belong to the first sub-codebook. N1=1, N2=Nb_max=2. According to the time sequence, the base station transmits: DCI1 to schedule 8 PDSCHs, Nb=2; DCI2 to schedule 4 PDSCHs, Nb=1; DCI3 to schedule 1 PDSCH; and DCI4 to schedule 8 PDSCHs, Nb=2. Then, the PDSCHs scheduled by DCI2 and DCI3 belong to the first sub-codebook, and DAI is counted according to DCI, DAI=1 and DAI=2, 2*N1=2 bits HARQ-ACK is generated; PDSCHs scheduled by DCI1 and DCI4 belong to the second sub-codebook, DAI is counted according to DCI, DAI=1 and DAI=2, 2*N2=4-bit HARQ-ACK is generated.

It is not difficult to see that if the UE does not detect DCI2, after receiving DCI3, the UE can determine that one DCI associated with the same sub-codebook is misdetected, and the UE can generate 1-bit NACK. Therefore, misdetection on DCI does not affect the size of the codebook.

(b) A dynamic codebook consists of only one sub-codebook. According to the maximum number of bundles (Nb_max) corresponding to one DCI, the number of HARQ-ACK bits (N0) corresponding to one DCI is determined. Wherein Nb_max is configured by the base station, or Nb_max is determined according to the maximum number of PDSCH bundles which can be scheduled by one or more DCI on one or more cells.

If the number of bundles (Nb) actually scheduled by one DCI is less than Nb_max, the UE still needs to determine the number of HARQ-ACK bits that have been fed back according to Nb_max. For example, Nb=2, NB_max=4, and the UE feeds back HARQ-ACK of 4 bits, wherein the first 2 bits determine the value of HARQ-ACK according to the demodulation result of PDSCH, and the last 2 bits are NACK.

If the number of configured bundles (Nb) corresponding to one DCI is less than Nb_max, the UE still needs to determine the number of HARQ-ACK bits that have been fed back according to Nb_max.

The number of DAI is counted based on DCI. For example, every time the UE receives a DCI, the number of DAI is increased by 1. The number of total HARQ-ACK bits is DAI*N0.

Figure 9:
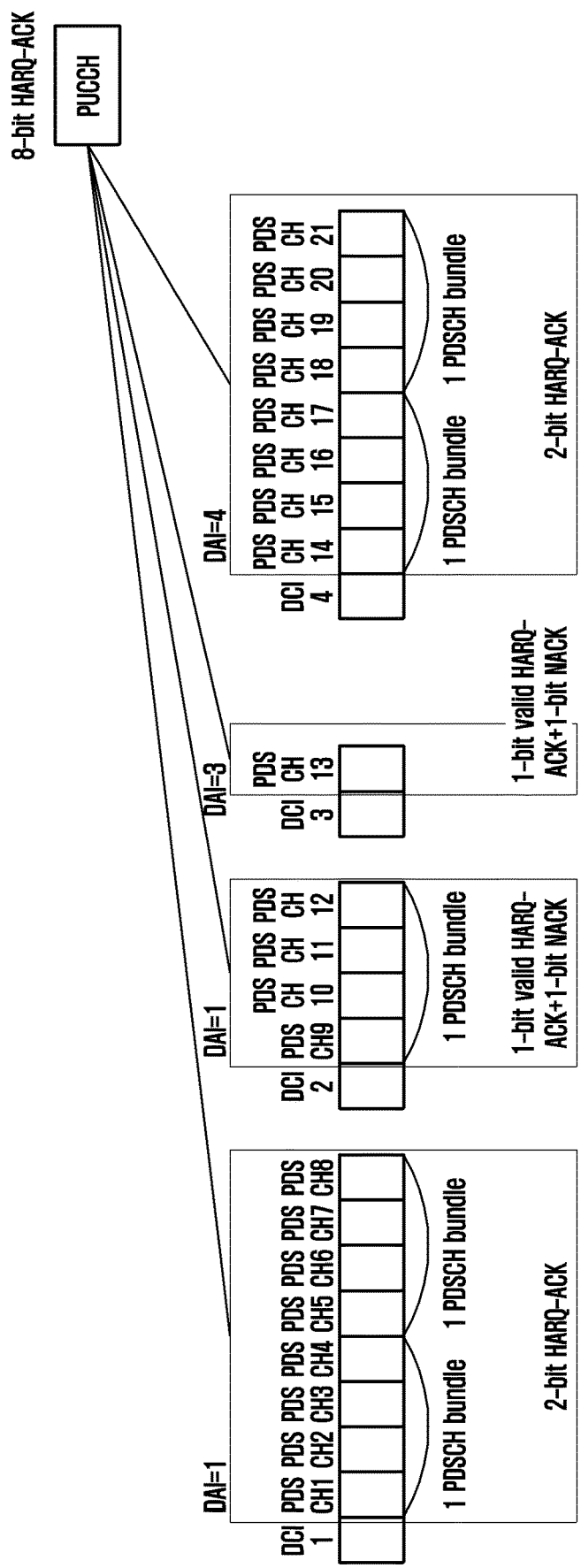
FIG. 9 illustrates an example in which there is one HARQ-ACK sub-codebook and the DAIs are counted according to an embodiment of the disclosure.

FIG. 9 illustrates an example in which there is one HARQ-ACK sub-codebook and the DAIs are counted according to an embodiment of the disclosure. It is assumed that the maximum value of Nb of respective downlink cells is N0=Nb_max=2. According to the time sequence, the base station transmits: DCI1 to schedule 8 PDSCHs, Nb=2; DCI2 to schedule 4 PDSCHs, Nb=1; DCI3 to schedule 1 PDSCH; and DCI4 to schedule 8 PDSCHs, Nb=2. Then, DAIs in DCIs 1~4 are 1,2,3,4 respectively, thereby resulting in 4*N0=8 bits HARQ-ACK.

Preferably, if the base station configures CBG-based transmission for UE, the dynamic codebook is based on 2 sub-codebooks. Wherein, The first sub-codebook consists of HARQ-ACK of at least one of the following types of PDSCH or PDCCH:
(1) HARQ-ACK of one PDSCH, if the reception of this PDSCH is TB based PDSCH reception.
Unlike (a), the PDCCH that schedules this PDSCH can schedule more than Y (>Y) PDSCHs, and the PDCCH that schedules this PDSCH can actually schedule Nb>$T_{bun}$ PDSCH bundles. For example, it is assumed that the number of PDSCHs (Np) scheduled by one DCI is more than 1 (Np>1), each PDSCH can only be TB based PDSCH, then the PDSCHs scheduled by this DCI belong to the first sub-codebook.

(2) HARQ-ACK of one PDSCH, if this PDSCH is SPS PDSCH;
(3) HARQ-ACK of one PDCCH, if this PDCCH is a PDCCH indicating SPS PDSCH release, or a PDCCH indicating Scell dormancy.

The total number of bits of the first sub-codebook is $DAI_{g1}*N1$, and $DAI_{g1}$ is DAI in PDCCH corresponding to the sub-codebook. N1 is the number of HARQ-ACK bits corresponding to each DAI of the sub-codebook, for example, N1=Nb_max.

If one PDCCH schedules one PDSCH, and this PDSCH includes 2 TBs, 1-bit HARQ-ACK is generated for each TB of the PDSCH of this PDCCH respectively, and (Nb_max−2) bits NACK is generated.

The second sub-codebook consists of HARQ-ACK of one PDSCH, if the reception of this PDSCH is CBG based PDSCH reception.

Preferably, the methods of determining for the first sub-codebook and the second sub-codebook are the same as the methods in (a).

According to some embodiments of the disclosure, the number of DAI is based on the number of DCI, as described in the previous various embodiments. According to other embodiments of the disclosure, the number of DAI is based on the number of the number of PDSCH bundle actually scheduled; or the number of DAI is based on the number of PDSCH bundle per DCI which is configured.

According to one embodiment, the number of DAI is based on the number of PDSCH bundle actually scheduled. For example, if the UE receives one DCI and the number of PDSCH bundle actually scheduled by this DCI is L, the number of DAI is increased by L. The number of DAI is based on the number of the first PDSCH bundles of multiple PDSCH bundles actually scheduled by DCI. For example, the first DAI is counted up to the first PDSCH bundle scheduled by the current DCI in the current PDCCH MO, which corresponds to the sum of PDSCH bundles of the same HARQ-ACK codebook. Or, the number of DAI is based on the number of the last PDSCH bundle of multiple PDSCH bundles actually scheduled by DCI. For example, the first DAI is counted up to the last PDSCH bundle scheduled by the current DCI in the current PDCCH MO, which corresponds to the sum of PDSCH bundles of the same HARQ-ACK codebook. For example, DCI1 schedules 8 PDSCHs which are 2 PDSCH bundles, and DCI2 after DCI1 schedules 4 PDSCHs which is 1 PDSCH bundle. If it is counted according to the first PDSCH bundle scheduled by each DCI, the value of DAI in DCI1 is 1 and the value of the DAI in DCI2 is 3. If it is counted according to the last PDSCH bundle scheduled by each DCI, the value of DAI in DCI1 is 2 and the value of DAI in DCI2 is 3.

According to another embodiment, the number of DAI is the number of PDSCH bundle per DCI which is based on the configuration. For example, if the UE receives one DCI, and the number of PDSCH bundle configured by this DCI is Nb_L, the number of DAI will be increased by NB_L. The number of DAI is based on the number of the first PDSCH bundle of multiple PDSCH bundles configured by DCI, or the number of the last PDSCH bundle of multiple PDSCH bundles actually scheduled by DCI. For example, the base station configures Nb_L=2 for downlink carrier CC1 and Nb_L=1 for downlink carrier CC2. On CC2, DCI1 schedules 1 PDSCH, and Nb_L=1 PDSCH bundle. Then, on CC1, DCI2 schedules 8 PDSCHs, and Nb_L=2 PDSCH bundles. If it is counted according to the first PDSCH bundle among Nb_L PDSCH bundles per DCI which is configured, the value of DAI in DCI1 is 1 and value of DAI in DCI2 is 2. If it is counted according to the last PDSCH bundle among Nb_L PDSCH bundles per DCI which is configured, the DAI in DCI1 is 1 and the DAI in DCI2 is 3. Preferably, if the base station configures that on one BWP on at least one carrier, one PDSCH can transmit up to Nu_tb TBs, for example, Nu_tb=2, then N1 of the first sub-codebook is equal to 1, and the number of HARQ-ACK bits of the first sub-codebook is $DAI_{g1}$; or N1=Nu_tb, and the number of HARQ-ACK bits of the first sub-codebook is $DAI_{g1}$*Nu_tb. When Nu_tb=2, in order to keep the HARQ-ACK bits corresponding to the DCI the same every time the value of DAI increases by 1, if L PDSCH bundles are actually scheduled by one PDCCH, the UE will generate L valid HARQ-ACK bits, that is, the HARQ-ACK generated according to the actual decoding result of PDSCH will also generate L NACK bits.

Preferably, if the base station configures that on one BWP on at least one cell, one PDSCH can transmit up to Nu_tb TBs, for example, Nu_tb=2, then the number of DAI in DCI that actually schedules Np>1 PDSCHs is based on the number of every Nu_tb PDSCH bundles. The number of HARQ-ACK bits in the first sub-codebook is $DAI_{g1}$*Nu_tb. In this way, redundant NACK bits caused by Nu_tb>1 can be avoided. For example, one PDSCH bundle includes 2 PDSCHs at most. If one PDCCH only schedules one PDSCH is scheduled, Nu_tb=2 TBs can be scheduled at most; if one PDCCH schedules more than one PDSCHs, each PDSCH is one TB. The dynamic codebook is based on one sub-codebook. DCI 0 schedules 1 PDSCH and 2 TBs; DCI1 after DCI0 schedules 8 PDSCHs which are 4 PDSCH bundles; and DCI2 after DCI1 schedules 4 PDSCHs which are 2 PDSCH bundles. Then, DAI in DCI0=1, DAI in DCI1=3 and DAI in DCI2=4. The UE generates 4*2=8 HARQ-ACK bits, wherein the first and second bits are 2 TBs of DCI0, and the third to eighth bits are HARQ-ACK of 6 PDSCH bundles of DCI1 and DCI2.

Preferably, if the base station configures CBG-based transmission for the UE, the dynamic codebook is based on 2 sub-codebooks. Wherein, The first sub-codebook consists of HARQ-ACK of at least one of the following types of PDSCH or PDCCH:
  (1) HARQ-ACK of one PDSCH, if the reception of this PDSCH is TB based PDSCH reception.
  Unlike (a), the PDCCH that schedules this PDSCH can schedule more than Y (>Y) PDSCHs, and the PDCCH that schedules this PDSCH can actually schedule Nb>$T_{bun}$ PDSCH bundles, or the number of the configured PDSCH bundles (Nb) corresponding to the PDCCH that schedules this PDSCH is more than $T_{bun}$ PDSCH bundles. For example, it is assumed that the number of PDSCHs (Np) scheduled by one DCI is more than 1 (Np>1), each PDSCH can only be TB based PDSCH, then the PDSCHs scheduled by this DCI belong to the first sub-codebook.
  (2) HARQ-ACK of one PDSCH, if this PDSCH is SPS PDSCH;
  (3) HARQ-ACK of one PDCCH, if this PDCCH is a PDCCH indicating SPS PDSCH release, or a PDCCH indicating Scell dormancy.

The total number of bits of the first sub-codebook is $DAI_{g1}$*N1, and $DAI_{g1}$ is DAI in PDCCH corresponding to the sub-codebook. N1 is the number of HARQ-ACK bits corresponding to each DAI of the sub-codebook, for example, N1=1, or N1=Nu_tb.

Preferably, if the base station configures that on one BWP on at least one cell, one PDSCH can transmit up to Nu_tb TBs, for example, Nu_tb=2, then the number of DAI in DCI that actually schedules Np>1 PDSCHs is based on the number of every Nu_tb PDSCH bundles. The number of HARQ-ACK bits in the first sub-codebook is $DAI_{g1}$*Nu_tb. In this way, redundant NACK bits caused by Nu_tb>1 can be avoided.

The second sub-codebook consists of: HARQ-ACK of one PDSCH, if the reception of this PDSCH is CBG based PDSCH reception.

To further reduce the overhead of DCI, the number of DAI is based on the number of PDSCH bundles actually scheduled, and the number of DAI is increased by 1 for M PDSCH bundles. If the number of PDSCH bundles actually scheduled (Nb) cannot be divided by M, it is counted according to the Z*M PDSCH bundles which are closest to Nb and not less than Nb. The number of bits of HARQ-ACK feedback is determined according to the value of DAI*M. If the total number of PDSCH bundles actually scheduled is less than the value of DAI*M, the predefined bits value are transmitted as placeholder until the number of HARQ-ACK bits is the value of DAI*M. Or, if the number of PDSCH bundles configured (Nb) cannot be divided by M, it is counted according to the Z*M PDSCH bundles which are closest to Nb and not less than Nb.

For example, M=2, that is, every increment of DAI value by 1 corresponds to 2 PDSCH bundles at most. One PDSCH bundle includes 4 PDSCHs at most. The dynamic codebook is based on one sub-codebook. DCI1 schedules 8 PDSCHs which are 2 PDSCH bundles, and DCI2 after DCI1 schedules 4 PDSCHs which are 1 PDSCH bundle. The value of DAI in DCI1 is 1 and the value of DAI in DCI 2 is 2. UE feedback 2*2=4 bits, wherein the first 2 bits correspond to two PDSCH bundles scheduled by DCI1, the third bit corresponds to one PDSCH bundle scheduled by DCI2, and the fourth bit is NACK.

For another example, M=2, that is, every increment of DAI value by 1 corresponds to 2 PDSCH bundles at most. One PDSCH bundle includes 2 PDSCHs at most. The dynamic codebook is based on 2 sub-codebooks. DCI 0 schedules 1 PDSCH which is 1 PDSCH bundle, DCI1 after DCI0 schedules 8 PDSCHs which are 4 PDSCH bundles, DCI2 after DCI1 schedules 4 PDSCHs which 2 PDSCH bundles, and DCI3 after DCI2 schedules 2 PDSCHs which are 1 PDSCH bundle.

PDSCH bundle of DCI0 corresponding to that of DCI 3 is 1, which is located in the first sub-codebook. DAI is counted in the first sub-codebook, the value of DAI in DCI0 is 1 and the value of DAI in DCI3 is 2. PDSCH bundle of DCI1 corresponding to that of DCI2 is greater than 1, which is located in the second codebook. DAI is counted in the second codebook, the value of DAI in DCI1 is 2 and the value of DAI in DCI 2 is 3. UE feedback 2+3*2=8 bits, wherein the first 2 bits are HARQ-ACK of the first sub-codebook, corresponding to PDSCH bundles scheduled by DCI0 and DCI3 respectively; and the last 6 bits are HARQ-ACK of the second sub-codebook, corresponding to 6 PDSCH bundles scheduled by DCI1 and DCI2 respectively.

For another example, M=2, that is, every increment of DAI value by 1 corresponds to 2 PDSCH bundles at most. One PDSCH bundle includes 2 PDSCHs at most. The dynamic codebook is based on one sub-codebook. DCI1 schedules 8 PDSCHs which are 4 PDSCH bundles, and DCI2 after DCI1 schedules 4 PDSCHs which are 2 PDSCH bundles. The value of DAI in DCI1 is 2 and the value of DAI in DCI 2 is 3. UE feedback 3*2=6 bits, wherein the first 4 bits correspond to 4 PDSCH bundles scheduled by DCI1 and the last 2 bits correspond to 2 PDSCH bundles scheduled by DCI2.

When the number of bits corresponding to one DCI is fixed, the dynamic codebook can be realized without increasing the overhead of DCI. For example, the numbers of HARQ-ACK bits corresponding to respective DCIs that schedules Np>1 PDSCHs and feedback HARQ-ACK in the same PUCCH are the same. The Type-2 HARQ-ACK codebook is generated according to at least one of the following:

(d) According to one method, the dynamic codebook is based on X(X>1) sub-codebooks. If the base station configures PDSCH bundle, it is determined in which sub-codebook the HARQ-ACK of a PDSCH scheduled by one DCI is located according to whether the number of bundles corresponding to one DCI exceeds the predefined threshold $T_{bun}$. As for the number of HARQ-ACK bits corresponding to a sub-codebook, the bits to be fed back are determined according to the maximum number of bundles of the sub-codebook. For example, the first sub-codebook is the sub-codebook where the PDSCH scheduled by the DCI for scheduling one PDSCH is located, the number of bundles is fixed at 1, the second sub-codebook is the sub-codebook where the PDSCH scheduled by the DCI for scheduling Np>1 PDSCHs is located, the number of bundles is fixed at Nb.

The number of DAI is counted based on DCI. For example, every time the UE receives a DCI, the number of DAI is increased by 1. The specific method will not be described again, and the reference can be made to (a).

(e) According to one method, the dynamic codebook is based on one sub-codebook. According to the maximum number of bundles (Nb_max) corresponding to one DCI, the number of HARQ-ACK bits corresponding to one DCI is determined. Wherein Nb_max is configured by the base station, or Nb_max is determined according to the maximum number of PDSCH bundles which can be scheduled by one or more DCI on one or more cells, for example, is determined according to the number Nb of bundles of DCI, which schedules Np>1 PDSCHs.

The number of DAI is counted based on DCI. For example, every time the UE receives a DCI, the number of DAI is increased by 1. The specific method will not be described again, and the reference can be made to (b).

In some embodiments, the UE is configured with dynamic HARQ-ACK codebook. If the UE is configured with multiple (for example, more than one) PDSCH receptions scheduled by a DCI (for example, the UE can be configured with the $3^{rd}$ generation partnership project (3GPP) parameter PDSCH-TimeDomainResourceAllocationListForMulti-PDSCH), and/or UE detects that one DCI format schedules more than one PDSCH reception, UE can also be separately configured with parameters for the number of PDSCH HARQ bundles (for example, 3GPP parameters numberOf-HARQ-BundlingGroups) for serving cells, and the HARQ-ACK codebook consists of two HARQ-ACK sub-codebooks.

The first HARQ-ACK sub-codebook consists of the following HARQ-ACK information bits of PDSCH and/or PDCCH:

SPS PDSCH reception.

any DCI format without scheduling PDSCH reception.

PDSCH reception scheduled by a DCI format scheduling one PDSCH.

PDSCH reception with $N_{HARQ-ACK}^{TBG,max}=1$ for TBG-based HARQ-ACK information on the $N_{cells}^{DL,TB}$ serving cells.

The second HARQ-ACK sub-codebook consists of

HARQ-ACK information bits of more than one PDSCH reception scheduled by one DCI format in one serving cell, and UE in the serving cell is not configured with the parameter for the number of PDSCH HARQ bundles.

HARQ-ACK information bits of PDSCH groups of more than one PDSCH reception scheduled by one DCI format in one serving cell, and the UE in the serving cell is configured with the parameter for the number of PDSCH HARQ bundles $N_{HARQ-ACK}^{TBG,max}>1$.

In the second HARQ-ACK sub-codebook, UE generates $N_{HARQ-ACK,max}^{TBG,max}$ HARQ-ACK information bits for each DCI format. $N_{HARQ-ACK,max}^{TBG,max}$ is the maximum value of $N_{TB,c}^{DL} \cdot N_{HARQ-ACK,max}^{TBG,max}$ and/or $N_{TB,c}^{DL} \cdot N_{PDSCH,c}^{max}$ on all the serving cells associated with the second HARQ-ACK sub-codebook (for example, the serving cell configured with more than one PDCH receptions scheduled by one DCI format and in which the UE is not configured with the parameter for the number of PDCH HARQ bundles; and the serving cell configured with more than one PDCH receptions scheduled by one DCI format and in which the UE is configured with the parameter for the number of PDCH HARQ bundles $N_{HARQ-ACK,max}^{TBG,max}>1$). Wherein, if the UE is not configured with parameter for spatial bundling (for example, 3GPP parameters harq-ACK-SpatialBundlingPUCCH and/or harq-ACK-SpatialBundlingPUCCH-secondaryPUCCH-group and/or harq-ACK-SpatialBundlingPUSCH), $N_{TB,c}^{DL}$ is the maximum number of TBs that one PDSCH in the serving cell c can include; otherwise $N_{TB,c}^{DL}=1$. $N_{PDSCH,c}^{max}$ is the maximum number of PDSCHs that can be scheduled by one DCI format in serving cell c. For serving cell c, if the UE is not configured with parameter for the number of PDSCH HARQ bundles, and the UE detects that more than one PDSCH is scheduled by one DCI format and $N_{TB,c}^{DL} \cdot N_{PDSCH,c}^{max} < N_{HARQ-ACK,max}^{TBG,max}$, the UE generates a NACK for the last $N_{HARQ-ACK,max}^{TBG,max} - N_{TB,c}^{DL} \cdot N_{PDSCH,c}^{max}$ HARQ-ACK information bits. For serving cell c, if the UE is configured with the parameter for the number of PDSCH HARQ bundles $N_{HARQ-ACK,max}^{TBG,max}>1$ and the UE detects that more than one PDSCH is scheduled by one DCI format and $N_{TB,c}^{DL} \cdot N_{HARQ-ACK,max}^{TBG,max} < N_{HARQ-ACK,max}^{TBG,max}$, the UE generates a NACK for the last $N_{HARQ-ACK,max}^{TBG,max} - N_{TB,c}^{DL} \cdot N_{HARQ-ACK,max}^{TBG,max}$ HARQ-ACK information bits.

Optionally, the second HARQ-ACK sub-codebook is not applicable for the scenario wherein the 3GPP parameter harq-ACK-SpatialBundlingPUCCH is configured.

The first HARQ-ACK sub-codebook may be located before or after the second HARQ-ACK sub-codebook.

The method clarifies the bit information of the HARQ-ACK codebook and improves the reliability of HARQ-ACK transmission. The method places the HARQ-ACK information bits for scheduling one PDSCH into the first HARQ-ACK sub-codebook, which can reduce the number of HARQ-ACK bits, improve the system spectrum efficiency and reduce the UE transmission power.

It should be noted that in the embodiment of this disclosure, a PDSCH can be a valid PDSCH and/or an invalid PDSCH unless otherwise specified.

A detailed example is as follows,

If one UE:

with respect to $N_{cells}^{DL,TBG}$ serving cells, is configured with one DCI to schedule multiple (for example, more than one) PDSCH receptions (for example, is configured with the 3GPP parameter PDSCH-TimeDomainResourceAllocationListForMultiPDSC) and, optionally (for example, if provided), configured with the parameter for the number of PDSCH HARQ bundles (for example, 3GPP parameter numberOfHARQ-BundlingGroups) $N_{HARQ\text{-}ACK,max}^{TBG,max} > 1$ and with respect to $N_{cells}^{DL,TB}$ serving cells, is not configured with one DCI to schedule multiple (for example, more than one) PDSCH receptions or is configured with the parameter for the number of PDSCH HARQ bundles $N_{HARQ\text{-}ACK,max}^{TBG,max} = 1$ wherein $N_{cells}^{DL,TB} + N_{cells}^{DL,TBG} = N_{cells}^{DL}$ According to the pseudo code of 3GPP TS 38.213 9.1.2.1 and the following modifications, the UE determines $õ_0^{ACK}$, $õ_1^{ACK}, \ldots, õ_{o_{ACK}-1}^{ACK}$ $N_{cells}^{DL}$, for determining the first HARQ-ACK sub-codebook, including SPS PDSCH reception.

DCI format without scheduling PDSCH reception.

PDSCH reception scheduled by a DCI format scheduling one PDSCH.

PDSCH reception with $N_{HARQ\text{-}ACK,max}^{TBG,max} = 1$ for TBG-based HARQ-ACK information on the $N_{cells}^{DL,TB}$ serving cells.

$N_{cells}^{DL}$ is replaced by $N_{cells}^{DL,TBG}$ for the determination of a second HARQ-ACK sub-codebook corresponding to the $N_{cells}^{DL,TBG}$ serving cells for TBG-based HARQ-ACK information, or for TB-based HARQ-ACK information corresponding to multiple PDSCH receptions scheduled by a single DCI format.

For one serving cell among $N_{cells}^{DL,TBG}$ serving cells, instead of generating one HARQ-ACK information bit for one transport block, the UE generates $N_{HARQ\text{-}ACK}^{TBG,max}$ HARQ-ACK information bits, wherein $N_{HARQ\text{-}ACK}^{TBG,max}$ is the maximum value of $N_{TB,c}^{DL} \cdot N_{HARQ\text{-}ACK,c}^{TBG,max}$ (if the UE is configured with the parameter for the number of PDSCH HARQ bundles) and/or $N_{TB,c}^{DL} \cdot N_{PDSCH,c}^{max}$ (if the UE is not configured with the parameter for the number of PDSCH HARQ bundles) in $N_{cells}^{DL,TBG}$ serving cells. Wherein, if the UE is not configured with spatial bundling parameters (for example, 3GPP parameters harq-ACK-SpatialBundlingPUCCH and/or harq-ACK-SpatialBundlingPUCCH-secondaryPUCCHgroup and/or harq-ACK-SpatialBundlingPUSCH), $N_{TB,c}^{DL}$ is the maximum number of TBs that one PDSCH in the serving cell c can include, otherwise $N_{TB,c}^{DL} = 1 \cdot N_{HARQ\text{-}ACK,c}^{TBG,max}$ is the value of parameter for the number of PDSCH HARQ bundles in the serving cell c. $N_{PDSCH,c}^{max}$ is the maximum number of PDSCH that can be scheduled by one DCI format in serving cell c. For serving cell c, if the UE is not configured with parameter for the number of PDSCH HARQ bundles, and the UE detects that more than one PDSCH is scheduled by one DCI format and $N_{TB,c}^{DL} \cdot N_{PDSCH,c}^{max} < N_{HARQ\text{-}ACK,max}^{TBG,max}$, the UE generates a NACK for the last $N_{HARQ\text{-}ACK,max}^{TBG,max} - N_{TB,c}^{DL} \cdot N_{PDSCH,c}^{max}$ HARQ-ACK information bits. For serving cell c, if the UE is configured with the parameter for the number of PDSCH HARQ bundles $N_{HARQ\text{-}ACK}^{TBG,max} > 1$ and the UE detects that more than one PDSCH is scheduled by one DCI format and $N_{TB,c}^{DL} \cdot N_{HARQ\text{-}ACK,c}^{TBG,max} < N_{HARQ\text{-}ACK,max}^{TBG,max}$, the UE generates a NACK for the last $N_{HARQ\text{-}ACK,max}^{TBG,max} - N_{TB,c}^{DL} \cdot N_{HARQ\text{-}ACK,c}^{TBG,max}$ HARQ-ACK information bits.

The method clarifies the bit information of the HARQ-ACK codebook and improves the reliability of HARQ-ACK transmission. The method places the HARQ-ACK information bit for scheduling one PDSCH into the first HARQ-ACK sub-codebook, which can reduce the number of HARQ-ACK bits, improve the system spectrum efficiency and reduce the UE transmission power.

Another detailed example is as follows,

If one UE:

with respect to $N_{cells}^{DL,MPDSCH}$ serving cells, is configured with one DCI to schedule multiple (for example, more than one) PDSCH receptions (for example, is configured with the 3GPP parameter PDSCH-TimeDomainResourceAllocationListForMultiPDSC) and is not configured with parameter for the number of PDSCH HARQ bundle, and optionally (for example, if provided), with respect to $N_{cells}^{DL,TBG}$ serving cells, is configured with the parameter for the number of PDSCH HARQ bundles (for example, 3GPP parameter numberOfHARQ-BundlingGroups) $N_{HARQ\text{-}ACK}^{TBG,max} > 1$, wherein $N_{cells}^{DL,MPDSCH} + N_{cells}^{DL,TBG} = N_{cells}^{DL,MPDSCH/TBG}$ and with respect to $N_{cells}^{DL,TB}$ serving cells, is not configured with one DCI to schedule multiple (for example, more than one) PDSCH receptions or is configured with the Parameter for the number of PDSCH HARQ bundles $N_{HARQ\text{-}ACK}^{TBG,max} = 1$ wherein $N_{cells}^{DL,TB} + N_{cells}^{DL,MPDSCH/TBG} = N_{cells}^{DL}$ According to the pseudo code of 3GPP TS 38.213 9.1.2.1 and the following modifications, the UE determines $õ_0^{ACK}$, $õ_1^{ACK}, \ldots õ_{o_{ACK}-1}^{ACK}$ $N_{cells}^{DL}$, for determining the first HARQ-ACK sub-codebook, including SPS PDSCH reception.

DCI format without scheduling PDSCH reception.

PDSCH reception scheduled by a DCI format scheduling one PDSCH.

PDSCH reception with $N_{HARQ\text{-}ACK}^{TBG,max} = 1$ for TBG-based HARQ-ACK information on the $N_{cells}^{DL,TB}$ serving cells.

$N_{cells}^{DL,MPDSCH/TBG}$, for determining the TBG-based HARQ-ACK information bits received by multi TBG (transport block group) scheduled by one DCI format in $N_{cells}^{DL,TBG}$ serving cells which are corresponding to the second HARQ-ACK sub-codebook, or corresponding to TBG-based HARQ-ACK information bits received by multiple PDSCHs which are scheduled by one DCI format in $N_{cells}^{DL,MPDSCH}$ serving cell.

For one serving cell among $N_{cells}^{DL,MPDSCH/TBG}$ serving cells, instead of generating one HARQ-ACK information bit for one transport block, the UE generates $N_{HARQ\text{-}ACK,max}^{TBG,max}$ HARQ-ACK information bits, wherein $N_{HARQ\text{-}ACK,max}^{TBG,max}$ is the maximum value of $N_{TB,c}^{DL} \cdot N_{HARQ\text{-}ACK,c}^{TBG,max}$ (if the UE is configured with the parameter for the number of PDSCH HARQ bundles) and/or $N_{TB,c}^{DL} \cdot N_{PDSCH,c}^{max}$ (if the UE is not configured with the parameter for the number of PDSCH HARQ bundles) in $N_{cells}^{DL,MPDSCH}$ serving cells. Wherein, if the UE is not configured with spatial bundling parameters (for example, 3GPP parameters harq-ACK-SpatialBundlingPUCCH and/or harq-ACK-SpatialBundlingPUCCH-secondaryPUCCHgroup and/or harq-ACK-SpatialBundlingPUSCH), $N_{TB,c}^{DL}$ is the maximum number of TBs that one PDSCH in the serving cell c can include, otherwise $N_{TB,c}^{DL} = 1$. $N_{HARQ\text{-}ACK,c}^{TBG,max}$ is the value of parameter for the number of PDSCH HARQ bundles in the serving cell c. $N_{PDSCH,c}^{max}$ is the maximum number of PDSCH that can be scheduled by one DCI format in serving cell c. For serving cell c, if the UE is not configured with parameter for the number of PDSCH HARQ bundles, and the UE detects that more than one PDSCH is scheduled by one DCI format and $N_{TB,c}^{DL} \cdot N_{PDSCH,c}^{max} < N_{HARQ-ACK,max}^{TBG,max}$, the UE generates a NACK for the last $N_{HARQ-ACK,max}^{TBG,max} - N_{TB,c}^{DL} \cdot N_{PDSCH,c}^{max}$ HARQ-ACK information bits. For serving cell c, if the UE is configured with the parameter for the number of PDSCH HARQ bundles $N_{HARQ-ACK}^{TBG,max} > 1$ and the UE detects that more than one PDSCH is scheduled by one DCI format and $N_{TB,c}^{DL} \cdot N_{HARQ-ACK,c}^{TBG,max} < N_{HARQ-ACK,max}^{TBG,max}$, the UE generates a NACK for the last $N_{HARQ-ACK,max}^{TBG,max} - N_{TB,c}^{DL} \cdot N_{HARQ-ACK,c}^{TBG,max}$ HARQ-ACK information bits.

The method clarifies the bit information of the HARQ-ACK codebook and improves the reliability of HARQ-ACK transmission. The method places the HARQ-ACK information bit for scheduling one PDSCH into the first HARQ-ACK sub-codebook, which can reduce the number of HARQ-ACK bits, improve the system spectrum efficiency and reduce the UE transmission power.

According to another aspect of this application, a method of implementing PDSCH bundle in semi-static codebook is proposed.

At operation 103, the UE determines the HARQ-ACK codebook for PDSCH according to the received PDSCHs and PDCCH. For the HARQ-ACK transmitted in one uplink time unit n, the UE needs to determine the candidate PDSCH reception position corresponding to respective HARQ-ACK bits to be placed in the HARQ-ACK codebook. Determining the candidate PDSCH reception position for placing HARQ-ACK bits includes determining the slot/sub-slot $n_{pdsch}$ where the candidate PDSCH reception position is located and the candidate PDSCH reception position $M_{pdsch}$ in the slot/sub-slot. The UE determines the candidate PDSCH reception position for placing respective HARQ-ACK bits in the HARQ-ACK codebook according to at least one of the following information, thereby determining the HARQ-ACK codebook:

(1) Time Offset Set K

The time offset set k is determined according to the set of time offsets K1 corresponding to DCI format of PDCCH needed to be monitored by UE.

Determining the set of slot/sub-slot $n_{pdsch}$ of the candidate PDSCH reception position according to the time offset set K.

(2) Time Offset Set K'

The time offset set K' is determined according to K1 and the time domain resources of Np PDSCH scheduled by one DCI. The time domain resources of Np PDSCH scheduled by one DCI are determined according to any row in the PDSCH TDRA table R. In particular, K1' corresponding to each PDSCH is determined according to the positions where the end symbols of the 1st to (Np-1)th PDSCHs are located and the position where the end symbol of the NP-th PDSCH is located (for example, the slot where the end symbol is located), and k1. Set k includes K1'. Wherein the position where the end symbol of PDSCH is located is the last uplink slot or sub-slot overlapping with the end symbol of this PDSCH; or position where the end symbol of PDSCH is located is the last uplink slot or sub-slot overlapping with the end position of the downlink slot or sub-slot where this PDSCH is located. For example, it is assumed that one row in table R corresponds to Np PDSCHs, namely $PDSCH_1$, $PDSCH_2 \ldots PDSCH_{Np}$, respectively. It is assumed that the slot/sub-slot where the end symbols of respective PDSCHs are located are $n_1, n_2, \ldots n_{Np}$, the respective slots/sub-slots may be the same or different. Then, k1' corresponding to respective PDSCH is equal to k1+ni-NNP (k1'=k1+ni-NNP).

According to the time offset set K', the set of slot/sub-slot $n_{pdsch}$ of the candidate PDSCH reception position is determined.

Preferably, the set of slot/sub-slot $n_{pdsch}$ of the candidate PDSCH reception position is determined according to the time offset set K' and the time offset set K.

Preferably, the time offset set K' is determined according to the time offset K1, the time domain resources of Np PDSCHs scheduled by one DCI, and the PDSCH bundles corresponding to Np PDSCHs. According to one implementation, the UE determines K1' according to the time domain resource for one PDSCH in a PDSCH bundle and the time domain resource for the reference PDSCH, and K1. Set K' includes K1'. For example, one DCI can schedule Np PDSCHs, and the Np-th PDSCH is the reference PDSCH. The Np PDSCHs are divided into Nb PDSCH bundles, and the last PDSCH of the $N_{bi}$-th PDSCH bundle is identified as $PDSCH_{bi}$. According to the slot offset between the slot $n_{bi}$ where the end symbol of $PDSC_{bi}$ is located and the slot $n_{Np}$ where the end symbol of NP-th PDSCH is located, and K1, it is determined that K1' corresponding to $PDSC_{bi}$ is equal to K1+Nbi-nNp (K1'=K1+Nbi-nNp).

Figure 10:
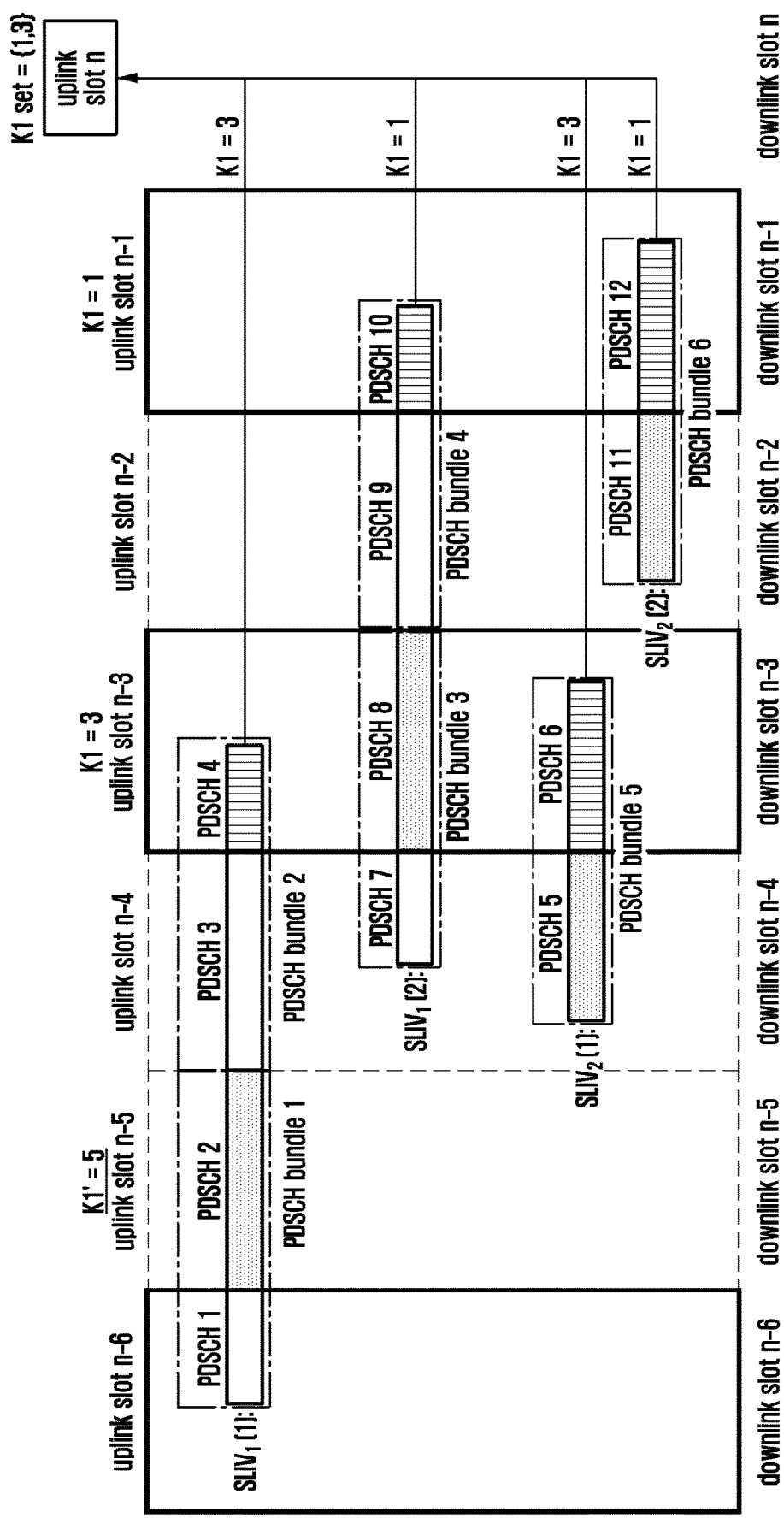
FIG. 10 illustrates a PDSCH TDRA table R according to an embodiment of the disclosure.

FIG. 10 illustrates a PDSCH TDRA table R according to an embodiment of the disclosure.

Referring to FIG. 10, it is assumed that K1 set is {1,3} and HARQ-ACK is transmitted in uplink slot n, then the base station can schedule four PDSCHs (PDSCHs 1~4) by one DCI, K1=3 and the time domain resource is denoted with SLIV(1); or the base station can schedule four PDSCHs (PDSCH 7~10) by one DCI, K1=1 and the time domain resource is denoted with SLIV(2); or the base station can schedule two PDSCH (PDSCH 5~6) by one DCI, K1=3 and the time domain resource is denoted with SLIV2(1), or the base station can schedule two PDSCHs (PDSCH 11~12) by one DCI, K1=1 and the time domain resource is denoted by SLIV2(2). Npb configured by higher layer is equal to 2 (Npb=2). The four PDSCH corresponding to SLIV1(1) can be divided into two PDSCH bundles, each of which includes two PDSCHs. The four PDSCHs corresponding to SLIV1(2) can be divided into two PDSCH bundles, each of which includes two PDSCHs. The two PDSCHs corresponding to SLIV2(1) can be divided into one PDSCH bundle, each of which includes two PDSCHs. The two PDSCHs corresponding to SLIV2(2) can be divided into one PDSCH bundle, each of which includes two PDSCHs. Then, for SLIV1(1), it is determined that K1'=K1+2=3+2=5 according to the slot offset between the slot where the last PDSCH (PDSCH 2) of PDSCH bundle1 is located and the slot where the last PDSCH (PDSCH 4) of SLIV1(1) is located, and the value of K1. For SLIV1(2), it is determined that K1'=K1+2=1+2=3 according to the slot offset between the slot where the last PDSCH (PDSCH 8) of PDSCH bundle3 is located and the slot where the last PDSCH (PDSCH 10) of SLIV1(2) is located, and the value of K1. Therefore, the time offset set K'={3,5}. According to the union set of the time offset set K' and the time offset set K, the set of slot/sub-slot $n_{pdsch}$ where the candidate PDSCH reception positions are located are determine to be slot n-1, slot n-3 and slot n-5.

Figure 11:
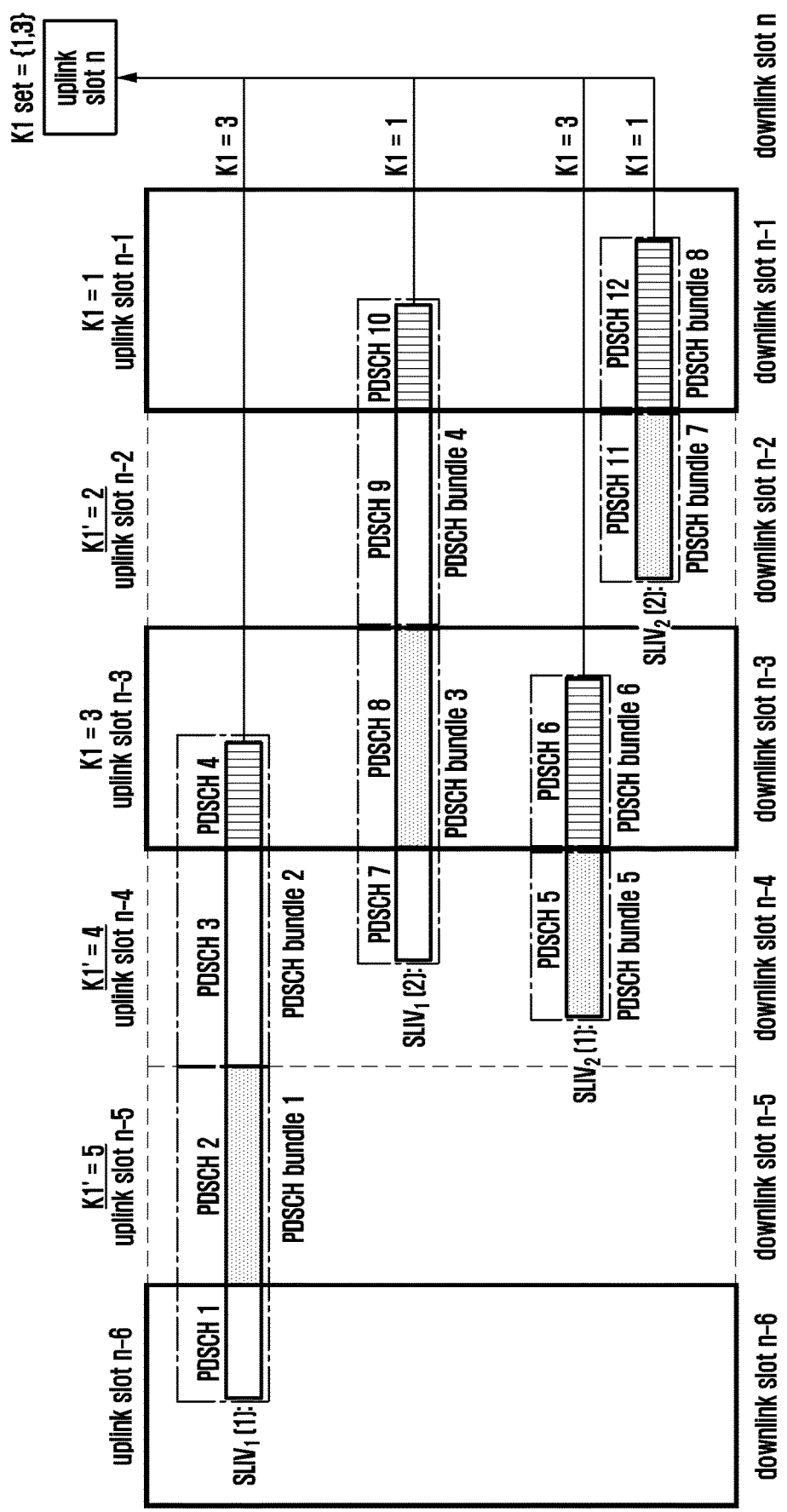
FIG. 11 illustrates a PDSCH TDRA table R according to an embodiment of the disclosure.

FIG. 11 illustrates a PDSCH TDRA table R according to an embodiment of the disclosure.

Referring to FIG. 11, it is assumed that K1 set is {1,3} and HARQ-ACK is transmitted in uplink slot n, then the base station can schedule four PDSCHs (PDSCHs 1~4) by one DCI, K1=3 and the time domain resource is denoted with SLIV(1); or the base station can schedule four PDSCHs (PDSCH 7~10) by one DCI, K1=1 and the time domain resource is denoted with SLIV(2); or the base station can schedule two PDSCH (PDSCH 5~6) by one DCI, K1=3 and the time domain resource is denoted with SLIV2(1), or the base station can schedule two PDSCHs (PDSCH 11~12) by one DCI, K1=1 and the time domain resource is denoted by SLIV2(2). Npb configured by higher layer is equal to 2 (Npb=2). The four PDSCH corresponding to SLIV1(1) can be divided into two PDSCH bundles, each of which includes two PDSCHs. The four PDSCHs corresponding to SLIV1(2) can be divided into two PDSCH bundles, each of which includes two PDSCHs. The two PDSCHs corresponding to SLIV2(1) can be divided into two PDSCH bundles, each of which includes one PDSCH. The two PDSCHs corresponding to SLIV2(2) can be divided into two PDSCH bundles, each of which includes one PDSCH. Then, for SLIV1(1), it is determined that K1'=K1+2=3+2=5 according to the slot offset between the slot where the last PDSCH (PDSCH 2) of PDSCH bundle1 is located and the slot where the last PDSCH (PDSCH 4) of SLIV1(1) is located, and the value of K1. For SLIV1(2), it is determined that K1'=K1+2=1+2=3 according to the slot offset between the slot where the last PDSCH (PDSCH 8) of PDSCH bundle3 is located and the slot where the last PDSCH (PDSCH 10) of SLIV1(2) is located, and the value of K1. For SLIV2(1), it is determined that K1'=K1+1=3+1=4 according to the slot offset between the slot where the last PDSCH (PDSCH 5) of PDSCH bundle5 is located and the slot where the last PDSCH (PDSCH 6) of SLIV2(1) is located, and the value of K1. For SLIV2(2), it is determined that K1'=K1+1=1+1=2 according to the slot offset between the slot where the last PDSCH (PDSCH 11) of PDSCH bundle7 is located and the slot where the last PDSCH (PDSCH 12) of SLIV2(2) is located, and the value of K1 Therefore, the time offset set K'={2,3,4,5}. According to the union set of the time offset set K' and the time offset set K, the set of slot/sub-slot $n_{pdsch}$ where the candidate PDSCH reception positions are located are determine to be slot n−1, slot n−2, slot n−3, slot n−4 and slot n−5.

(3) Set of PDSCH TDRA Table R

In a slot/sub-slot $n_{pdsch}$ where the candidate PDSCH reception position is located, the candidate PDSCH reception position $M_{pdsch}$ can be determined according to the valid SLIVs in the PDSCH TDRA table R in the slot/sub-slot.

In the set of slot/sub-slot $n_{pdsch}$ where the candidate PDSCH reception position is located, the candidate PDSCH reception position $M_{pdsch}$ can be determined according to the valid SLIVs in the PDSCH TDRA table R in the set.

When the SLIVs of one row in table R correspond to Np>1 PDSCHs, one SLIV includes SLIV information and K0 information of Np PDSCHs.

The valid SLIVs can be determined according to at least one of the following methods:

2.1 when determining the candidate PDSCH reception position in the current slot/sub-slot, the SLIV of each PDSCH of each row in the PDSCH TDRA table R is taken as the candidate of the valid SLIV.

In the subsequent step, the HARQ-ACK of Np PDSCHs in one row are respectively placed in the candidate PDSCH reception positions corresponding to the respective PDSCHs in this row.

2.2 when determining the candidate PDSCH reception position in the current slot/sub-slot, only the SLIV of the last PDSCH of each row in the PDSCH TDRA table R is taken as the candidate of the valid SLIV.

In the subsequent step, the HARQ-ACK of Np PDSCHs in one row are placed in the candidate PDSCH reception position corresponding to the SLIV of the last PDSCH of the row. In the candidate PDSCH reception position, this valid SLIV can be further simplified according to the SLIV of the last PDSCH and other SLIVs.

2.3 when determining the candidate PDSCH reception position in the current slot/sub-slot, only the SLIV of one PDSCH in each PDSCH bundle among Nb PDSCH bundles in each row in the PDSCH TDRA table R is taken as the candidate of the valid SLIV, for example, the SLIV of the last PDSCH in each PDSCH bundle is taken as the candidate of the valid SLIV.

The valid SLIV determined according to 2.1 or 2.2 or 2.3 may include the time domain resources on which the base station cannot actually transmit PDSCH. In order to reduce the HARQ-ACK overhead of the semi-static codebook, the valid SLIV can be further simplified according to at least one of the following methods. The disclosure does not limit the time sequence of executing the following methods.

According to the PDCCH monitoring occasion/PDCCH alternative position and the parameter K0 in PDSCH TDRA table R, it is determined whether a SLIV is valid or not. If a valid PDCCH alternative position (or PDCCH MO) cannot be found according to the start point and K0 of the first PDSCH of one SLIV, the SLIV is invalid, otherwise the SLIV is valid.

According to the uplink and/or downlink configuration, for example, TDD-UL-DL-ConfigurationCommon or TDD-UL-DL-ConfigurationDedicated, it is determined whether a SLIV is valid or not. For example, in the respective $SLIV_{ri,j}$ of Np PDSCHs in the SLIVri in the i-th row of PDSCH TDRA table R (j=1, 2 . . . NP), if at least one symbol in each $SLIV_{ri,j}$ is the configured uplink symbol, then each $SLIV_{ri,j}$ is invalid, and the SLIVri in the i-th row is invalid. If for respective SLIVs in the i-th row, only at least one symbol in $SLIV_{ri,j}$ is the configured uplink symbol, then $SLIV_{ri,j1}$ is invalid, other $SLIV_{ri,j2}$ (j1≠j2) are valid, and SLIVri is valid. For example, in the $SLIV_{ri,j}$ of respective PDSCHs in the $N_{bi}$-th PDSCH bundle of the SLIVri in the i-th row of PDSCH TDRA table R, if at least one symbol of each $SLIV_{ri,j}$ is the configured uplink symbol, then each $SLIV_{ri,j}$ in this PDSCH bundle is invalid, and the SLIV corresponding to this PDSCH bundle is invalid. If the SLIV of this PDSCH bundle is represented by the SLIV of the last PDSCH ($PDSCH_{bi}$) of this PDSCH bundle, then the $SLIV_{ri,j}$ corresponding to $PDSCH_{bi}$ is invalid. If for respective PDSCHs in the $N_{bi}$-th PDSCH bundle, only at least one symbol in $SLIV_{ri,j1}$ is the configured uplink symbol, then $SLIV_{ri,j1}$ is invalid and other $SLIV_{ri,j2}$(j1≠j2) in this PDSCH bundle are valid. Thus the SLIV of this PDSCH bundle is valid, for example, $SLIV_{ri,j}$ corresponding to the last PDSCH ($PDSCH_{bi}$) of this PDSCH bundle is valid. Taking FIG. 10 as an example, PDSCH bundle1 includes PDSCH 1 and PDSCH 2, and the SLIV of PDSCH bundle1 is represented by the SLIV of PDSCH2. If the SLIV of at least one of PDSCHs in PDSCH1 and PDSCH2 is valid, that is, it does not collide with the uplink symbols of semi-static configuration, then the SLIV of PDSCH bundle1 is valid, that is, the SLIV of PDSCH2 is valid.

According to the respective rows in PDSCH TDRA table R, it is determined whether respective SLIVs overlap. For respective SLIVs which overlap, only one SLIV is valid, and other SLIVs are invalid. HARQ-ACK of PDSCHs corresponding to these SLIVs are all associated with the candidate PDSCH reception position determined according to this valid SLIV.

Preferably, when determining whether the respective SLIVs overlap, in the set of $n_{pdsch}$ of the slot/sub-slot where the candidate PDSCH reception position is located, the valid SLIVs in the same and different slots/sub-slots can be jointly processed to determine whether they overlap or not, and the valid SLIVs can be determined. Preferably, one row in Table R is taken as one SLIV, and the SLIVs in the same and different slots/sub-slots are processed. Preferably, one PDSCH bundle in one row in Table R as is taken as one SLIV, and the SLIVs in the same and different slots/sub-slots are processed. For example, one row in table R corresponds to PDSCHs 1~4, and is divided into two PDSCH bundles, each of which includes PDSCHs 1~2, PDSCHs 3~4, respectively. When being processed, the SLIV of PDSCHs 1~2 is taken as one SLIV, and the SLIV of PDSCHs 3~4 is taken as another SLIV. In the set of slot/sub-slot $n_{pdsch}$ of the candidate PDSCH reception position, besides the SLIVs corresponding to different rows in table R, such as $SLIV_{r1}$ and $SLIV_{r2}$, there may also be SLIVs corresponding to the same row in table R, with the start point being in different slots. Different k is adopted to denote the different slots where the start point is located, for example, the smaller the value of k, the earlier the start point is in time. If $SLIV_{r1}(k1)$ and $SLIV_{r2}(k2)$ overlap/partially overlap, the candidate PDSCH reception position unit is determined according to $SLIV_{r1}(k1)$. The SLIV of $SLIV_{r2}(k2)$ is deleted and no longer participates in the determination of the candidate PDSCH reception position unit. SLIVr1(k1) and SLIV r2(k2) correspond to the same candidate PDSCH reception position unit.

Figure 12:
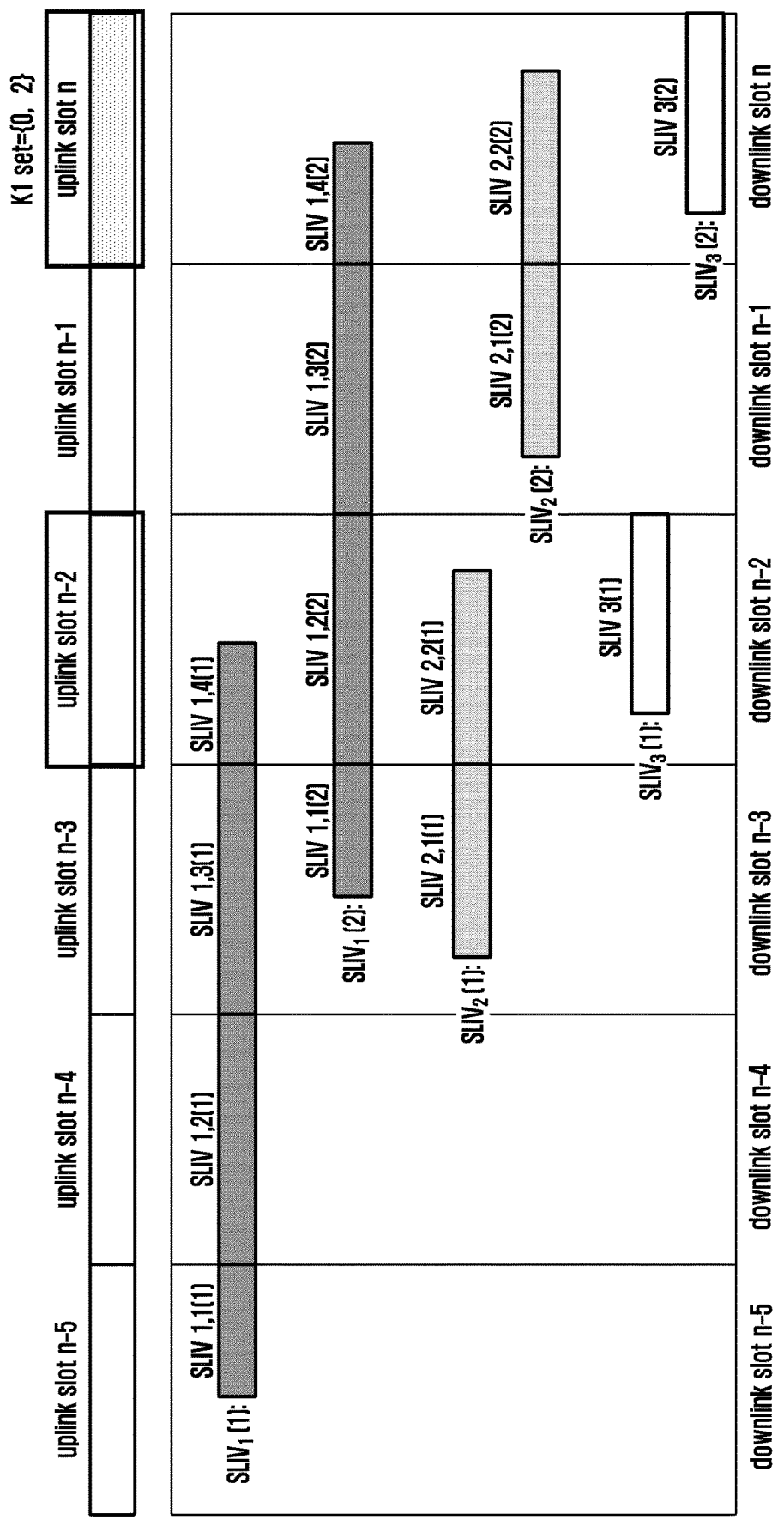
FIG. 12 illustrates a PDSCH TDRA table R according to an embodiment of the disclosure.

FIG. 12 illustrates a PDSCH TDRA table R according to an embodiment of the disclosure.

Referring to FIG. 12, k1=0,2, and the set of slots $n_{pdsch}$ is determined to be slot n-5 to slot n according to the set K and the set K'. In the set of slots $n_{pdsch}$, if $SLIV_1(1)$, $SLIV_1(2)$, $SLIV_2(1)$ and SLIV3(1) overlap in slot n-3 and/or slot n-2, then $SLIV_1(1)$ with the earliest end position is retained as the valid SLIV, and $SLIV_1(2)$, $SLIV_2(1)$ and SLIV3(1) are deleted. If $SLIV_2(2)$ and SLIV3(2) overlap in slot n-1 and/or slot N, $SLIV_2(2)$ with the earliest end position is retained as the valid SLIV and $SLIV_3(2)$ is deleted. Therefore, the valid SLIVs are $SLIV_1(1)$ and $SLIV_2(2)$.

Figure 13:
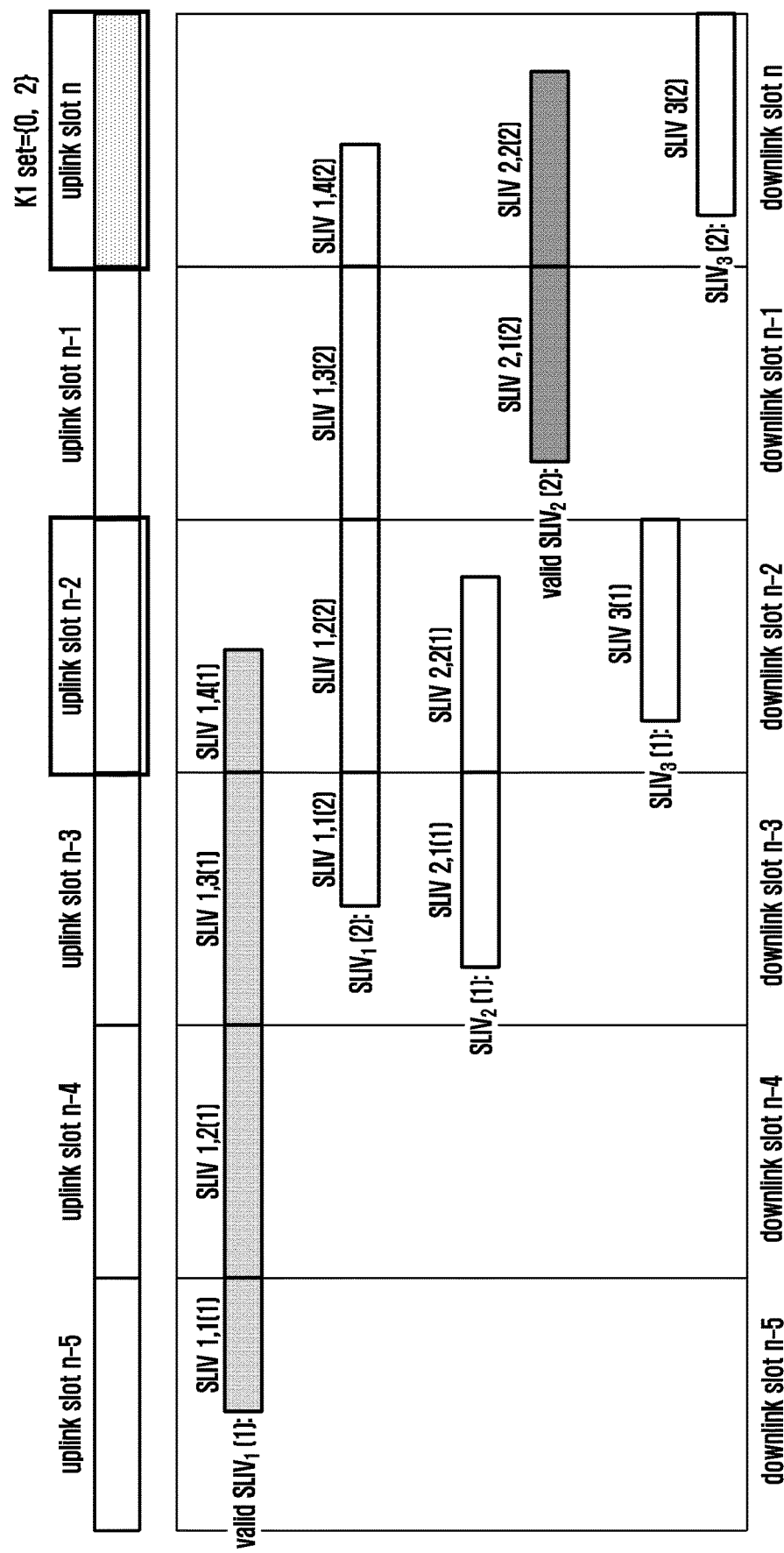
FIG. 13 illustrates a PDSCH TDRA table R according to an embodiment of the disclosure.

FIG. 13 illustrates a PDSCH TDRA table R according to an embodiment of the disclosure.

Referring to FIG. 13, K1={0,2}, and the PDSCH bundle includes 2 PDSCHs. K'={2,4}, the set of slots $n_{pdsch}$ is determined to be slot n, slot n-2 and slot n-4 according to the set K and the set K'. In the set of slot $n_{pdsch}$, if the SLIVs of PDSCH bundles 2, 3 and 5 overlap, then the SLIV1,4(1) of PDSCH bundle 2 with the earliest end position is retained as the valid SLIV, and the SLIVs of PDSCH bundles 3 and 5 are deleted. If PDSCH bundles 4 and 6 overlap, then the SLIV1, 4 (2) with the earliest end position is retained as the valid SLIV, and the SLIV of PDSCH bundle 6 is deleted. Therefore, in the set of slot $n_{pdsch}$, the valid SLIVs are the SLIVs of PDSCH bundle 1, PDSCH bundle 2 and PDSCH bundle 4.

Preferably, when determining whether the respective SLIVs overlap, in the set of $n_{pdsch}$ of the slot/sub-slot where the candidate PDSCH reception position is located, the valid SLIVs in the same slots/sub-slots can be processed to determine whether they overlap or not, and the valid SLIVs can be determined. For example, the four PDSCHs corresponding to $SLIV_1$ are located in four slots respectively. When determine whether they overlap, only $SLIV_{1,1}$, $SLIV_{1,2}$, $SLIV_{1,3}$ and $SLIV_{1,4}$ are separately determined in corresponding slot among the four slots, instead of $SLIV_{1,1}$, $SLIV_{1,2}$, $SLIV_{1,3}$ and $SLIV_{1,4}$ being jointly processed. For example, in FIG. 13, k1=0,2, and the set of slots $n_{pdsch}$ is determined to be slot n-5 to slot n according to the set K and the set K'. In each slot, it is determined whether respective SLIVs in one slot overlap or not. Therefore, in slot n-5, the valid SLIV is SLIV1,1(1); in slot n-4, the valid SLIV is SLIV1,2(1); in slot n-3, the valid SLIV is SLIV1,3(1), and SLIV1,3(1) and SLIV1,1(2) and SLIV2,1(1) are all correspond to the same SLIV; in slot n-2, the valid SLIV is SLIV1,4(1), and SLIV1,4(1) and SLIV1,2(2), SLIV2,2(1) and SLIV3,1(1) are all correspond to the same SLIV; in slot n-1, the valid SLIV is SLIV1,3(2), and SLIV1,3(2) and SLIV2,1(2) are all correspond to SLIV1,3(2); in slot n, the valid SLIV is SLIV1,4(2), and SLIV1,4(2) and SLIV2,2(2) are all correspond to SLIV3(2), which are corresponding to a same SLIV. For another example, in FIG. 12, K1=0,2, and the set of slots $n_{pdsch}$ is slot n and slot n-2 according to the set K. In slot n-2, the valid SLIV is SLIV1,4(1), and SLIV1,4(1), SLIV1,2(2), SLIV2,2(1) and SLIV3(1) are all corresponding to a same SLIV. In slot n, the valid SLIV is SLIV1,4(2), and SLIV1,4(2) and SLIV2,2(2) are all corresponding to SLIV3(2), which are all corresponding to a same SLIV.

The number of candidate PDSCH reception positions included in the candidate PDSCH reception position units corresponding to the valid $SLIV_{ri}(k)$ of multiple PDSCHs scheduled by one DCI is determined in accordance with one of the following methods:

(a) The number of candidate PDSCH reception positions included in the candidate PDSCH reception position units corresponding to a $SLIV_{ri}(k)$ is determined by the number of PDSCH bundles (Nb) included in this SLIV.

(b) The number of candidate PDSCH reception positions included in the candidate PDSCH reception position units corresponding to a $SLIV_{ri}(k)$ is determined by the maximum number of PDSCH bundles corresponding to respective SLIVs, which are corresponding to the same candidate PDSCH reception position unit as this SLIV (that is, the maximum value of Nb of these SLIVs).

(c) The number of candidate PDSCH reception positions included in the candidate PDSCH reception position units corresponding to a $SLIV_{ri}(k)$ is determined by the maximum value (Nb_max) of the number of PDSCH bundles included in all the $SLIVr_l$, l=1, 2 ... $\ell$(R). Where, $\ell$(R) is the number of rows in the set R.

(d) The number of candidate PDSCH reception positions included in the candidate PDSCH reception position units corresponding to a $SLIV_{ri}(k)$ is 1. In the detailed implementation, the step of determining the candidate PDSCH reception position unit can be skipped, and a candidate PDSCH reception position can be directly determined according to a $SLIV_{ri}(k)$.

The number of candidate PDSCH reception positions included in the candidate PDSCH reception position unit corresponding to the valid $SLIV_{ri}(k)$ which are corresponding to one PDSCH bundle is determined according to the above-mentioned method (d). The number of HARQ-ACK bits corresponding to one candidate PDSCH reception position is determined according to at least one of the following methods:

(e) The number of HARQ-ACK bits corresponding to one candidate PDSCH reception position is determined by the number of HARQ-ACK bits corresponding to this PDSCH.

(f) The number of HARQ-ACK bits corresponding to one candidate PDSCH reception position is determined by the number of HARQ-ACK bits of a PDSCH bundle corresponding to this PDSCH reception position.

(g) The number of HARQ-ACK bits corresponding to one candidate PDSCH reception position is determined by the number of HARQ-ACK bits of Nq PDSCHs corresponding to this PDSCH reception position.

Nq is determined by the number of HARQ-ACK bits corresponding to Nb PDSCH bundles determined by SLIV which determines this PDSCH reception position.

Or, Nq is determined by the number of HARQ-ACK bits corresponding to the maximum value of the number of PDSCH bundles of the respective SLIVs which are corresponding to this PDSCH reception position, that is, determined by the maximum value (Nb) of respective SLIVs.

Or, Nq is determined by the number of HARQ-ACK bits corresponding to the maximum value (Nb_max) of the number of PDSCH bundles included in all $SLIVr_l$, l=1, 2 . . . $\ell$ (R).

Or, Nq is determined by the number of HARQ-ACK bits of one PDSCH at this PDSCH reception position. For example, the PDSCH corresponding to one PDSCH position is a PDSCH scheduled by a single PDSCH. The number of HARQ-ACK bits corresponding to this PDSCH position is determined according to the HARQ-ACK of this PDSCH.

Preferably, if one PDSCH bundle corresponds to multiple candidate PDSCH reception positions, the HARQ-ACK of this PDSCH bundle is repeatedly transmitted in the multiple candidate PDSCH reception positions.

Preferably, if one PDSCH bundle corresponds to multiple candidate PDSCH reception positions, the HARQ-ACK of this PDSCH bundle is transmitted in one of the multiple candidate PDSCH reception positions, and the predefined HARQ-ACK, e.g., NACK, is transmitted in other PDSCH reception positions.

According to one example, the number of HARQ-ACK bits corresponding to one candidate PDSCH reception position is determined according to (d) and (g), wherein according to (g), Nq is determined by the number of HARQ-ACK bits corresponding to the maximum value (Nb_max) of the number of PDSCH bundles included in all $SLIVr_l$, l=1, 2 . . . $\ell$ (R). Taking FIG. 8 as an example, after simplifying $\ell$ respective SLIVs, the valid $SLIV_1(1)$ and $SLIV_2(2)$ are determined, which respectively correspond to one candidate PDSCH reception position unit, and the number of candidate PDSCH reception positions included in each candidate PDSCH reception position unit is 1. It is assumed that the HARQ-ACK bit of one PDSCH reception position is 1 bit. Nb_max=2. For the valid $SLIV_1(1)$, $SLIV_1(1)$, $SLIV_2(1)$, $SLIV_1(2)$ and $SLIV_3(1)$ overlap and correspond to a same PDSCH reception position, the number of PDSCH bundles of $SLIV_1(1)$, $SLIV_2(1)$, $SLIV_1(2)$ and SLIV3(1) are 2, 1, 2, 1, respectively. The HARQ-ACK bits corresponding to the candidate PDSCH reception positions which are corresponding to the valid $SLIV_1(1)$ are determined by the number of HARQ-ACK corresponding to Nb_max=2 PDSCH bundles, that is, 2 bits. For the valid $SLIV_2(2)$, $SLIV_2(2)$ and SLIV3(2) overlap and correspond to a same PDSCH reception position unit, the number of PDSCH bundles of $SLIV_2(2)$ and $SLIV_3(2)$ are 1 and 1 respectively. The HARQ-ACK bits corresponding to the candidate PDSCH reception positions which are corresponding to the valid $SLIV_2(2)$ are also determined by the number of HARQ-ACK corresponding to Nb_max=2 PDSCH bundles, that is, 2 bits. UE generates 1-bit HARQ-ACK and 1-bit NACK according to the decoding result of PDSCH in one received PDSCH bundle. Then, this HARQ-ACK codebook consists of 4 bits.

According to one example, the number of HARQ-ACK bits corresponding to one candidate PDSCH reception position is determined according to (b) and (f).

Referring to FIG. 8, after simplifying respective SLIVs, the valid $SLIV_1(1)$ and $SLIV_2(2)$ are determined, which respectively correspond to one candidate PDSCH reception position unit. For the valid $SLIV_1(1)$, $SLIV_1(1)$, $SLIV_2(1)$, $SLIV_1(2)$ and $SLIV_3(1)$ overlap and correspond to a same PDSCH reception position, the number of PDSCH bundles of $SLIV_1(1)$, $SLIV_2(1)$, $SLIV_1(2)$ and $SLIV_3(1)$ are 2, 1, 2, 1, respectively and the maximum value of 2 is taken. Therefore, the candidate PDSCH reception position unit corresponding to the valid $SLIV_1(1)$ includes two candidate PDSCH reception positions. For the valid $SLIV_2(2)$, $SLIV_2(2)$ and $SLIV_3(2)$ overlap and correspond to a same PDSCH reception position unit, the number of PDSCH bundle of $SLIV_2(2)$ and $SLIV_3(2)$ are 1 and 1 respectively, the maximum value of 1 is taken. Therefore, the candidate PDSCH reception position unit corresponding to the valid $SLIV_2(2)$ includes one candidate PDSCH reception position. It is assumed that the HARQ-ACK bit of one PDSCH reception position is 1 bit, it is 3*1=3 bits in total. It is assumed that the base station configures 2 TBs, and the HARQ-ACK bit of one PDSCH reception position is 2 bits, the total number is 3*2=6 bits.

The number of candidate PDSCH reception positions included in the candidate PDSCH reception position unit corresponding to one valid $SLIV_{ri,j}$ (k) is determined in accordance with one of the following methods:

(h) According to any one of (a) to (b), the number of candidate PDSCH reception positions included in the candidate PDSCH reception position unit corresponding to one SLIVri,j(k) is determined.

(i) The number of candidate PDSCH reception positions included in the candidate PDSCH reception position unit corresponding to one $SLIV_{ri,j}$ (k) is 0 or 1.

If one $SLIV_{ri,j1}(k)$ and $SLIV_{ri,j2}(k)$ correspond to the same PDSCH bundle, select the candidate PDSCH reception position unit corresponding to one $SLIV_{ri,j}$. Preferably, the PDSCH with the PDSCH time domain resource earlier in time in the same PDSCH bundle corresponds to the candidate PDSCH reception position unit, that is, $SLIV_{ri,j1}(k)$ corresponds to one PDSCH reception position, and $SLIV_{ri,j2}(k)$ corresponds to zero PDSCH reception positions, wherein j1<j2.

Preferably, the PDSCH with the PDSCH time domain resource later in time in the same PDSCH bundle corresponds to the candidate PDSCH reception position unit, that is, $SLIV_{ri,j1}(k)$ corresponds to 0 PDSCH reception positions, and $SLIV_{ri,j2}(k)$ corresponds to 1 PDSCH reception position, wherein j1>j2.

The number of HARQ-ACK bits corresponding to one candidate PDSCH reception position is determined according to at least one of the following methods:

(j) According to any one of (e) to (g), the number of HARQ-ACK bits corresponding to one candidate PDSCH reception position is determined.

(k) The number of HARQ-ACK bits corresponding to one candidate PDSCH reception position is the number of HARQ-ACK bits of a PDSCH bundle, or 0 bits.

If a $SLIV_{ri,j1}(k)$ and $SLIV_{ri,j2}(k)$ correspond to the same PDSCH bundle, a candidate PDSCH reception unit corresponding to one $SLIV_{ri,j}$ is selected to bear the HARQ-ACK bit of this PDSCH bundle, and another candidate PDSCH reception unit to bear 0-bit HARQ-ACK.

In some implementation, the UE is configured with a semi-static HARQ-ACK codebook, and the UE is configured with multiple PDSCHs that can receive one DCI schedule in one serving cell (for example, a row in the TDRA table includes multiple SLIVs), wherein the set of PDSCH time domain resource allocation (TDRA) table is R. If the UE is configured with PDSCH bundling (for example, the UE is configured with PDSCH bundling in time domain; for example, it can be configured by the 3GPP parameter enableTimeDomainHARQ-Bundling), the UE can convert the TDRA table into a TDRA table with only one SLIV in one row (the number of SLIVs in one row is 1), and the SLIV of each row in the converted TDRA table corresponds to the last SLIV of the row in the original TDRA table.

For example, let R'=R, let R be a set of rows in set R' (or set R), and each of these rows includes the last SLIV in the row corresponding to the set R'

UE can determine whether one SLIV is a valid SLIV according to the corresponding row r in the set R'.

In one example, for a certain serving cell c, a downlink active BWP and an uplink active BWP, the UE determines a set of $M_{A,c}$ opportunities for receiving the candidate PDSCH, wherein the UE transmits the corresponding HARQ-ACK information bits received by the candidate PDSCH on one PUCCH in the uplink slot $n_U$ downlink assignment index (e.g., n−6, n−5, . . . n). For the set of slot timing values K1, the UE can determine the set of $M_{A,c}$ opportunities according to pseudo code-1.

[Pseudo Code-1]

Set j=0—the candidate PDSCH reception or SPS PDSCH releases occasion index.
  setB=0
  Set$M_{A,c}$=Ø
  Set $\ell$ ($K_1$) to the cardinality of the set $K_1$. $\ell$
  Set k=0−index of slot timing values $K_{1,k}$, in descending order of the slot timing values, in set $K_1$ for serving cell c If a UE is not provided the carrier aggregation slot offset parameter (for example, the 3GPP parameter ca-SlotOffset) for any serving cell of PDSCH receptions and for the serving cell of corresponding PUCCH transmission with HARQ-ACK information
  while k<$\ell$ ($K_1$)
    if mod ($n_U$−$K_{1,k}$+1,max($2^{\mu_{UL}-\mu_{DL}}$,1))=0
    Set $n_D$=0−index of a downlink slot overlapping with an uplink slot (index of a downlink slot within an uplink slot), for example, the uplink slot$_{n_0}$−$K_{1,k}$
    While $n_D$<max($2^{\mu_{DL}-\mu_{UL}}$, 1)
    Set R to a set of rows, for example, a set of rows configured by the TDRA table.
    Set $\ell$ (R) to the cardinality of the set R.
    Set r=0—the index of row in set R.
    if slot $n_U$ starts at a same time as or after a slot for an active DL BWP change on serving cell c or an active UL BWP change on the PCell and slot $\lfloor(n_U-K_{1,k})\cdot 2^{\mu_{DL}-\mu_{UL}}\rfloor+n_D$ is before the slot for the active DL BWP change on serving cell c or the active UL BWP change on the PCell
    $n_D$=$n_D$+1;
    else
    while r<$\ell$ (R)
    if the UE is not provided time domain HARQ bundling enabling parameter (for example, 3GPP parameter enableTimeDomainHARQ-Bundling) and is provided TDD-UL-DL-ConfigurationCommon, or TDD-UL-DL-ConfigurationDedicated and, for each slot from slot $\lfloor(n_U-K_{1,k})\cdot 2^{\mu_{DL}-\mu_{UL}}\rfloor+n_D-N_{PDSCH}^{repeat,max}+1$ to slot $\lfloor(n_U-K_{1,k})\cdot 2^{\mu_{DL}-\mu_{UL}}\rfloor+n_D$, at least one symbol of the PDSCH time resource derived by row r is configured as UL where $K_{1,k}$ is the k-th slot timing value in set $K_1$, or if HARQ-ACK information for PDSCH time resource derived by row r in slot $\lfloor(n_U-K_{1,k})\cdot 2^{\mu_{DL}-\mu_{UL}}\rfloor+n_D$ cannot be provided in slot $n_U$
    R=R\r;
    else
    if the UE is provided time domain HARQ bundling enabling parameter (for example, 3GPP parameter enableTimeDomainHARQ-Bundling) and TDD-UL-DL-ConfigurationCommon, or TDD-UL-DL-ConfigurationDedicated and, for each slot $\lfloor(n_U-K_{1,k})\cdot 2^{\mu_{DL}-\mu_{UL}}\rfloor+n_D-\Delta K_{0,r}(d)$, at least one symbol of the PDSCH time resource derived by row r of set R' is configured as UL, where d=0, 1, . . . , C($\Delta K_{0,r}$)−1, $$\Delta K_{0,r} = \max_{K_0}(K_{0,r}) - K_{0,r},$$

and C($\Delta K_{0,r}$) is the cardinality of $\Delta K_{0,r}$.
    R=R\r;
    R'=R'\r;
    else
    r=r+1;
    end if
    end while
    if the UE does not indicate a capability to receive more than one unicast PDSCH per slot and R≠Ø,
    $M_{A,c}$=$M_{A,c}$∩j;
    j=j+1;
    else
    Set C(R) to the cardinality of R
    Set m to the smallest last OFDM symbol index, as determined by the SLIV, among all rows of R
    while R≠Ø
    Set r=0
    while r<$\ell$ (R)
    if S≤m for the start symbol index S for row r
    $b_{r,k,n_D}$=j; −index of occasion for candidate PDSCH reception or SPS PDSCH release associated with row r
    R=R\r;
    B=B∪$b_{r,k,n_D}$;
    else
    r=r+1;
    end if
    end while
    $M_{A,c}$=$M_{A,c}$∪j;
    j=j+1;
    Set m to the smallest last OFDM symbol index among all rows of R;
    end while
    end if
    $n_D$=$n_D$+1;
    end if
    end while
    end if
    k=k+1;
    end while
  else
  while k<$\ell$ (K)
  if $$\text{mod}\left(n_U - K_{1,k} + \left\lfloor\left(\frac{N_{slot,offset}^{UL}}{2^{\mu_{offset,UL}}} - \frac{N_{slot,offset,c}^{DL}}{2^{\mu_{offset,DL,c}}}\right)\cdot 2^{\mu_{UL}}\right\rfloor + 1, \max(2^{\mu_{UL}-\mu_{DL}}, 1)\right) = 0$$

Set $n_D=0$—index of a downlink slot overlapping with an uplink slot (index of a downlink slot within an uplink slot), for example, the uplink slot. $n_0-K_{1,k}$
while $n_D<\max(2^{\mu_{DL}-\mu_{UL}}, 1)$
Set R to the set of rows, for example, the set of rows configured by TDRA table. $\ell$
Set $\ell$ (R) to the cardinality of set R.
Set r=0—the index of rows in set R.
if slot $n_U$ starts at a same time as or after a slot for an active DL BWP change on serving cell c or an active UL BWP change on the PCell and slot $$\lfloor (n_U - K_{1,k}) \cdot 2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$$

is before the slot for the active DL BWP change on serving cell c or the active UL BWP change on the PCell
    $n_D=n_D+1$;
    else
    while $r<\ell$ (R)
    if the UE is not provided time domain HARQ bundling enabling parameter (for example, 3GPP parameter enableTimeDomainHARQ-Bundling) and is provided TDD-UL-DL-ConfigurationCommon, or TDD-UL-DL-ConfigurationDedicated and, for each slot from slot $$\lfloor (n_U - K_{1,k}) \cdot 2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor +$$

$$n_D - N^{repeat,max}_{PDSCH} + 1 \text{ to slot } \lfloor (n_U - K_{1,k}) \cdot 2^{\mu_{DL}-\mu_{UL}} \rfloor +$$

$$\left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D,$$

at least one symbol of the PDSCH time resource derived by row r is configured as UL where $K_{1,k}$ is the k-th slot timing value in set $K_1$, or if HARQ-ACK information for PDSCH time resource derived by row r in slot $$\lfloor (n_U - K_{1,k}) \cdot 2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$$

cannot be provided in slot $n_U$
    R=R\r;
    elseif the UE is provided time domain HARQ bundling enabling parameter (for example, 3GPP parameter enableTimeDomainHARQ-Bundling) and TDD-UL-DL-ConfigurationCommon, or TDD-UL-DL-ConfigurationDedicated and, for each slot $$\lfloor (n_U - K_{1,k}) \cdot 2^{\mu_{DL}-\mu_{UL}} \rfloor +$$

$$\left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D - \Delta K_{0,r}(d),$$

at least one symbol of the PDSCH time resource derived by row r of set R' is configured as UL, where d=0, 1, . . . , $C(\Delta K_{0,r})-1$.
    R=R\r;
    R'=R'\r;
    else
    r=r+1;
    end if
    end while
    if the UE does not indicate a capability to receive more than one unicast PDSCH per slot and $R \neq \emptyset$,
        $M_{A,c}=M_{A,c} \cap j$;
        j=j+1;
    else
        Set $\ell$ (R) to the cardinality of R.
        Set m to the smallest last OFDM symbol index, as determined by the SLIV, among all rows of R.
        while $R \neq \emptyset$
        Set r=0
        while $r<\ell$ (R)
        if $S \leq m$ for the start symbol index S for row r
            $b_{r,k,n_D}=j$; —index of occasion for candidate PDSCH reception or SPS PDSCH release associated with row r
            R=R\r;
            $B=B \cup_{b,k,n_D}$;
        else
            r=r+1;
        end if
        end while
        $M_{A,c}=M_{A,c} \cup j$;
        j=+1;
        Set the m to the smallest last OFDM symbol index among all rows of R;
        end while
    end if
    $n_D=n_D+1$;
    end if
    end while
    end if
    k=k+1;
    end while
end if The method can reduce the number of the bits of HARQ-ACK codebook, improve the reliability of HARQ-ACK transmission, and improve the network performance.

In some implementations, the UE is configured with semi-static HARQ-ACK codebook, and the UE is configured to receive multiple PDSCHs scheduled by one DCI in one serving cell (for example, one row in the TDRA table includes multiple SLIVs). If the UE is configured with PDSCH bundling (for example, the UE is configured with PDSCH bundling in time domain; e.g., it can be configured by the 3GPP parameter enableTimeDomainHARQ-Bundling), the UE generates HARQ-ACK information bits only for the PDSCH candidate position corresponding to the last SLIV among multiple SLIVs in a row of TDRA table, and generates NACK for the PDSCH candidate position not corresponding to the last SLIV. During RM (Reed Muller) coding, the transmission power is determined according to the number of bits unknown to the base station, so the known NACK bits will not increase the transmission power, which can reduce the transmission power of UE and the interference to other users.

For example, the UE can determine the HARQ-ACK codebook according to the pseudo code-2.

[Pseudo Code-2]
    Set c=0—serving cell index
    Set j=0—HARQ-ACK information bit index
    Set $N_{cells}^{DL}$ to the number of serving cells configured by higher layer signaling for the UE.
    while $c<N_{cells}^{DL}$
    Set m=0—index of occasion for candidate PDSCH reception while m<$M_c$ if time domain HARQ bundling enabling parameter (for example, 3GPP parameter enableTimeDomainHARQ-Bundling) is provided for serving cell c and a PDSCH is scheduled by a DCI format indicating a TDRA row that includes more than one SLIV entry if the time domain resources of this PDSCH are associated with the last SLIV of the row (for example, row r)

$\tilde{o}_j^{ACK}$=binary AND operation of the HARQ-ACK information bits corresponding to all transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c;

j=j+1;

else $\tilde{o}_j^{ACK}$=NACK;

j=j+1;

end if end if end while c=c+1;

end while

It should be noted that the binary AND operation is that if all binary numbers are 1, the result is 1; otherwise, the result is 0, that is, if at least one binary number is 0, the result is 0.

The method clarifies that the behavior of the UE, may improve the reliability of HARQ-ACK codebook and reduce PDSCH retransmission, thereby improving the network performance.

In one example, the UE may determine the HARQ-ACK codebook according to the pseudo code-9.

[Pseudo Code-9]

Set c=0–serving cell index

Set j=0–HARQ-ACK information bit index

Set $N_{cells}^{DL}$ to the number of serving cells configured by higher layer for the UE.

while c<$N_{cells}^{DL}$

Set m=0–index of occasion for candidate PDSCH reception while m<$M_c$ if time domain HARQ bundling enabling parameter (for example, 3GPP parameter enableTimeDomainHARQ-Bundling) is provided for serving cell c and a PDSCH is scheduled by a DCI format if harq-ACK-SpatialBundlingPUCCH is not provided and the UE is configured by maxNrofCodeWordsScheduledByDCI with reception of two transport blocks for the active DL BWP of serving cell c, if the time domain resource of the PDSCH is associated with the last SLIV of a row (for example, row r)

$\tilde{o}_j^{ACK}$=binary AND operation of the HARQ-ACK information bits corresponding to first transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c else $\tilde{o}_j^{ACK}$=NACK;

end if j=j+1;

if the time domain resource of the PDSCH is associated with the last SLIV of a row (for example, row r)

$\tilde{o}_j^{ACK}$=binary AND operation of the HARQ-ACK information bits corresponding to second transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c else $\tilde{o}_j^{ACK}$=NACK;

j=j+1;

elseif harq-ACK-SpatialBundlingPUCCH is provided and the UE is configured by maxNrofCodeWordsScheduledByDCI with reception of two transport blocks for the active DL BWP of serving cell c, if the time domain resource of this PDSCH is associated with the last SLIV of a row (for example, row r)

$\tilde{o}_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c if the UE receives one transport block, the UE assumes ACK for the second transport block;

else $\tilde{o}_j^{ACK}$=NACK;

end if j=j+1;

else if the time domain resource of the PDSCH is associated with the last SLIV of a row (for example, row r)

$\tilde{o}_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c else $\tilde{o}_j^{ACK}$=NACK;

end if j=j+1;

end if end if end while c=c+1;

end while

The method clarifies that the behavior of the UE, may improve the reliability of HARQ-ACK codebook and reduce PDSCH retransmission, thereby improving the network performance.

In one example, the UE may determine the HARQ-ACK codebook according to the pseudo code-3.

[Pseudo Code-3]

Set c=0–serving cell index

Set j=0–HARQ-ACK information bit index

Set $N_{cells}^{DL}$ to the number of serving cells configured by higher layer for the UE.

while c<$N_{cells}^{DL}$

Set m=0–index of occasion for candidate PDSCH reception while m<$M_c$ if time domain HARQ bundling enabling parameter (for example, 3GPP parameter enableTimeDomainHARQ-Bundling) is provided for serving cell c and a PDSCH is scheduled by a DCI format if harq-ACK-SpatialBundlingPUCCH is not provided and the UE is configured by maxNrofCodeWordsScheduledByDCI with reception of two transport blocks for the active DL BWP of serving cell c if the time domain resource of the PDSCH is associated with the last SLIV of a row (for example, row r)

$õ_j^{ACK}$=binary AND operation of the HARQ-ACK information bits corresponding to first transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c;

j=j+1;

$õ_j^{ACK}$=binary AND operation of the HARQ-ACK information bits corresponding to second transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c;

j=j+1;

else $õ_j^{ACK}$=NACK;

j=j+1;

$õ_j^{ACK}$=NACK;

j=j+1;

end if elseif harq-ACK-SpatialBundlingPUCCH is provided and the UE is configured by maxNrofCodeWordsScheduledByDCI with reception of two transport blocks for the active DL BWP of serving cell c, if the time domain resource of the PDSCH is associated with the last SLIV of a row (for example, row r);

$õ_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c if the UE receives one transport block, the UE assumes ACK for the second transport block;

else $õ_j^{ACK}$=NACK;

end if j=j+1;

else if the time domain resource of the PDSCH is associated with the last SLIV of a row (for example, row r)

$õ_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c else $õ_j^{ACK}$=NACK;

end if j=j+1;

end if end if end while c=c+1;

end while

The method clarifies that the behavior of the UE, may improve the reliability of HARQ-ACK codebook and reduce PDSCH retransmission, thereby improving the network performance.

In one example, the UE may determine the HARQ-ACK codebook according to the pseudo code-4.

[Pseudo Code-4]

Set c=0-serving cell index

Set j=0-HARQ-ACK information bit index

Set $N_{cells}^{DL}$ to the number of serving cells configured by higher layer for the UE.

while c<$N_{cells}^{DL}$

Set m=0-index of occasion for candidate PDSCH reception while m<$M_c$

If time domain HARQ bundling enabling parameter (for example, 3GPP parameter enableTimeDomainHARQBundling) is provided for serving cell c and a PDSCH is scheduled by a DCI format if harq-ACK-SpatialBundlingPUCCH is not provided and the UE is configured by maxNrofCodeWordsScheduledByDCI with reception of two transport blocks for the active DL BWP of serving cell c if the time domain resources of the PDSCH is associated with the last SLIV of a row (for example, row r)

$õ_j^{ACK}$=binary AND operation of the HARQ-ACK information bits corresponding to first transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c;

j=j+1;

$õ_j^{ACK}$=binary AND operation of the HARQ-ACK information bits corresponding to second transport blocks in PDSCH receptions, that do not overlap with an uplink symbol indicated by TDD-UL-DL-ConfigurationCommon or TDD-UL-DL-ConfigurationDedicated, scheduled by the DCI format on serving cell c else $õ_j^{ACK}$=NACK;

j=j+1;

$õ_j^{ACK}$=NACK;

end if j=j+1;

elseif harq-ACK-SpatialBundlingPUCCH is provided and the UE is configured by maxNrofCodeWordsScheduledByDCI with reception of two transport blocks for the active DL BWP of serving cell c, if the time domain resource of the PDSCH is associated with the last SLIV of a row (for example, row r)

$õ_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c, if the UE receives one transport block, the UE assumes ACK for the second transport block;

else $õ_j^{ACK}$=NACK;

end if j=j+1;

else if the time domain resource of the PDSCH is associated with the last SLIV of a row (for example, row r)

$õ_j^{ACK}$=binary AND operation of the HARQ-ACK information bits corresponding to all transport blocks in PDSCHs, that do not overlap with an uplink symbol indicated by TDD-UL-DL-ConfigurationCommon or TDD-UL-DL-ConfigurationDedicated, scheduled by the DCI format of serving cell c else $õ_j^{ACK}$=NACK;

end if j=j+1;

end if end if
end while
c=c+1;
end while

The method clarifies that the behavior of the UE, may improve the reliability of HARQ-ACK codebook and reduce PDSCH retransmission, thereby improving the network performance.

According to another aspect of the application, a method for implementing PDSCH bundle in one-shot HARQ-ACK codebook is proposed.

The base station can trigger the transmission of Type-3 (the third type) HARQ-ACK codebook. Type-3 HARQ-ACK codebook consists of HARQ-ACK information bits of PDSCHs of some or all HARQ processes.

According to one implementation, whether the base station configures PDSCH bundling or not, in the Type-3 HARQ-ACK codebook, the UE does not perform logical AND operation on the HARQ-ACK of PDSCH of respective HARQ process, but independently feeds back the HARQ-ACK of respective PDSCHs. Because the size of Type-3 HARQ-ACK codebook is fixed, HARQ-ACK bundle cannot reduce UCI overhead. Therefore, separately feeding back the HARQ-ACK of respective PDSCH can improve the accuracy of the HARQ-ACK feedback without increasing the UCI overhead.

According to another implementation, which may occur in the detailed implementation, if the base station configures PDSCH bundling, the UE only stores the results after the HARQ-ACK bundle, but does not store the independent HARQ-ACK of respective PDSCHs. In the Type-3 HARQ-ACK codebook, the UE can only feed back the results of the HARQ-ACK bundle. Then, according to the bundle relationship determined when being scheduled, the UE feeds back the same HARQ-ACK after the bundle, with respect to respective HARQ processes belonging to the same bundle. Or, the UE only feeds back the results of the HARQ-ACK bundle in the HARQ-ACK position of one of the multiple HARQ processes in the same bundle, and feeds back predefined HARQ-ACK values, such as NACK, in the HARQ-ACK positions of other HARQ processes among these HARQ processes.

Although the various embodiments of the disclosure are mainly described from the UE side, those skilled in the art will understand that the various embodiments of the disclosure also include operations on the base station side, and the base station side will perform operations corresponding to those on the UE side.

Those skilled in the art will understand that the various illustrative logical blocks, modules, circuits, and steps described in this application can be implemented as hardware, software, or a combination of both. In order to clearly illustrate this interchangeability of hardware and software, various illustrative components, blocks, modules, circuits, and steps are generally described above in the form of their function sets. Whether such a feature set is implemented as hardware or software depends on the specific application and design constraints imposed on the overall system. Those skilled in the art can implement the described function set in different ways for each specific application, but such design decisions should not be construed as causing a departure from the scope of this application.

The various illustrative logic blocks, modules, and circuits described in this application can be implemented or executed by general-purpose processors, digital signal processors (DSP), application-specific integrated circuits (ASIC), field programmable gate arrays (FPGA) or other programmable logic devices, discrete gate or transistor logic, discrete hardware components, or any combination designed to perform the functions described herein. A general-purpose processor may be a microprocessor, but in the alternative embodiment, the processor may be any conventional processor, controller, microcontroller, or state machine. The processor may also be implemented as a combination of computing devices, such as a combination of a DSP and a microprocessor, multiple microprocessors, one or more microprocessors in cooperation with a DSP core, or any other such configuration.

The steps of the method or algorithm described in this application can be directly embodied in hardware, in a software module executed by a processor, or in a combination thereof. The software module may reside in RAM memory, flash memory, ROM memory, erasable programmable ROM (EPROM) memory, electrically erasable programmable ROM (EEPROM) memory, registers, hard disk, removable disk, or any other form of storage medium known in the art. A storage medium is coupled to the processor such that the processor can read information from/write information to the storage medium. In the alternative embodiment, the storage medium may be integrated into the processor. The processor and the storage medium may reside in the ASIC. The ASIC may reside in the user terminal. In the alternative embodiment, the processor and the storage medium may reside as discrete components in the user terminal.

In one or more designs, the functions described may be implemented in hardware, software, firmware, or any combination thereof. If implemented in software, each function can be stored as one or more instructions or codes on a computer-readable medium or transmitted through it. Computer-readable media includes both computer storage media and communication media, the latter including any media that facilitates the transfer of a computer program from one place to another. The storage medium may be any available medium that can be accessed by a general-purpose or special-purpose computer.

The embodiments of this application are only intended for the convenience of description and to help comprehensive understanding of this application, and are not intended to limit the scope of this application. Therefore, it should be understood that, in addition to the embodiments disclosed herein, all modifications and changes or forms of modifications and changes derived from the technical idea of the disclosure fall within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
    receiving, via higher layer signaling, a time domain bundling configuration to enable bundling corresponding to a logical AND operation for a semi-static hybrid automatic repeat request acknowledgement (HARQ-ACK) codebook;
    receiving, via the higher layer signaling, a time domain duplex (TDD) configuration;
    receiving downlink control information (DCI) including information indicating a row including more than one starting and length values (SLIVs) of a time domain resource allocation (TDRA) table;

determining candidate physical downlink shared channel (PDSCH) reception occasions for the semi-static HARQ-ACK codebook;

determining a HARQ-ACK information bit in the semi-static HARQ-ACK codebook associated with a candidate PDSCH reception occasion based on performing the logical AND operation of HARQ-ACK information bits corresponding to a plurality of PDSCHs, wherein the plurality of PDSCHs, that do not overlap with an uplink (UL) symbol identified by the TDD configuration, are scheduled by the DCI; and transmitting the semi-static HARQ-ACK codebook.

2. The method of claim 1, wherein, for each slot of a downlink (DL) slot set, at least one symbol of each PDSCH time resource derived by a row r of a set R' is configured as UL by the TDD configuration, a set R is set as R\r and the set R' is set as R'r for determining the candidate PDSCH reception occasions, and wherein the set R' includes a plurality of SLIVs of rows in the TDRA table, and the set R includes last SLIVs of the rows.

3. The method of claim 2, wherein a number of slots in the DL slot set is associated with a value $\Delta K_{0,r}(d)$, and wherein $$d = 0, 1, \ldots, \underline{C} \in (\Delta K_{0,r}) - 1, \Delta K_{0,r} = \max_{K_0}(K_{0,r}) - K_{0,r}, -\underline{C} \in (\Delta K_{0,r})$$

is cardinality of $\Delta K_{0,r}$, $K_{0,r}$ is slot offset $K_0$ values for the row r.

4. The method of claim 2, wherein the semi-static HARQ-ACK codebook is transmitted via a physical uplink control channel (PUCCH) in an UL slot $n_U$, and wherein each slot of the DL slot set corresponds to a value plus $n_D - \Delta K_{0,r}(d)$, where:

the value corresponds to a smallest index of a DL slot overlapping with an UL slot $n_U - K_{1,k}$, k is an index of slot timing values $K_{1,k}$, $n_D$ is an index of a DL slot overlapping with an UL slot, and $$d = 0, 1, \ldots, "C"(\Delta K\_"0,r") - 1, \Delta K_{0,r} = \max_{K_0}(K_{0,r}) - K_{0,r}, "C"(\Delta K\_"0,r")$$

is cardinality of $$\Delta K_{0,r}, K_{0,r}$$

is slot offset $K_0$ values for the row r.

5. The method of claim 1, wherein in case that a PDSCH associated with the candidate PDSCH reception occasion is associated with a last SLIV among the more than one SLIVs included in the row indicated by the information, the HARQ-ACK information bit is determined based on performing the logical AND operation of the HARQ-ACK information bits corresponding to the plurality of PDSCHs, and wherein in case that the PDSCH associated with the candidate PDSCH reception occasion is not associated with the last SLIV, the HARQ-ACK information bit is determined as negative ACK (NACK).

6. A user equipment (UE) in a communication system, the UE comprising:

a transceiver; and a processor coupled with the transceiver and configured to:

receive, via higher layer signaling, a time domain bundling configuration to enable bundling corresponding to a logical AND operation for a semi-static hybrid automatic repeat request acknowledgement (HARQ-ACK) codebook;

receive, via the higher layer signaling, a time domain duplex (TDD) configuration;

receive downlink control information (DCI) including information indicating a row including more than one starting and length values (SLIVs) of a time domain resource allocation (TDRA) table;

determine candidate physical downlink shared channel (PDSCH) reception occasions for the semi-static HARQ-ACK codebook;

determine a HARQ-ACK information bit in the semi-static HARQ-ACK codebook associated with a candidate PDSCH reception occasion based on performing a logical AND operation of HARQ-ACK information bits corresponding to a plurality of PDSCHs, wherein the plurality of PDSCHs, that do not overlap with an uplink (UL) symbol identified by the TDD configuration, are scheduled by the DCI; and transmit the semi-static HARQ-ACK codebook.

7. The UE of claim 6, wherein for each slot of a downlink (DL) slot set, at least one symbol of each PDSCH time resource derived by a row r of a set R' is configured as UL by the TDD configuration, a set R is set as R\r and the set R' is set as R'\r for determining the candidate PDSCH reception occasions, and wherein the set R' includes a plurality of SLIVs of rows in the TDRA table, and the set R includes last SLIVs of the rows.

8. The UE of claim 7, wherein a number of the slots is associated with a value $\Delta K_{0,r}(d)$, and wherein $$d = 0, 1, \ldots, C(\Delta K_{0,r}) - 1, \Delta K_{0,r} = \max_{K_0}(K_{0,r}) - K_{0,r}, C(\Delta K_{0,r})$$

is cardinality of $\Delta K_{0,r}$, $K_{0,r}$ is slot offset $K_0$ values for the row r.

9. The UE of claim 6, wherein in case that a PDSCH associated with the candidate PDSCH reception occasion is associated with a last SLIV among the more than one SLIVs included in the row indicated by the information, the HARQ-ACK information bit is determined based on performing the logical AND operation of the HARQ-ACK information bits corresponding to the plurality of PDSCHs, and wherein in case that the PDSCH associated with the candidate PDSCH reception occasion is not associated with the last SLIV, the HARQ-ACK information bit is determined as negative ACK (NACK).

10. The UE of claim 6,
wherein the semi-static HARQ-ACK codebook is transmitted via a physical uplink control channel (PUCCH) in an UL slot $n_U$, and
wherein each slot of the DL slot set corresponds to a value plus $n_D - \Delta K_{0,r}(d)$, where:
the value corresponds to a smallest index of a DL slot overlapping with an UL slot $n_U - K_{1,k}$,
k is an index of slot timing values $K_{1,k}$,
$n_D$ is an index of a DL slot overlapping with an UL slot, and $$d = 0, 1, \ldots, "C"(\Delta K\_"0,r") - 1, \Delta K_{0,r} = \max_{K_0}(K_{0,r}) - K_{0,r}, "C"(\Delta K\_"0,r")$$

is cardinality of $$\Delta K_{0,r}, K_{0,r}$$

is slot offset $K_0$ values for the row r.

11. A method performed by a base station (BS) in a communication system, the method comprising:
transmitting, via higher layer signaling, a time domain bundling configuration information to enable bundling corresponding to a logical AND operation for a semi-static hybrid automatic repeat request acknowledgement (HARQ-ACK) codebook;
transmitting, via the higher layer signaling, a time domain duplex (TDD) configuration;
transmitting downlink control information (DCI) including information indicating a row including more than one starting and length values (SLIVs) of a time domain resource allocation (TDRA) table; and
receiving the semi-static HARQ-ACK codebook,
wherein the semi-static HARQ-ACK codebook includes a HARQ-ACK information bit associated with a candidate physical downlink shared channel (PDSCH) reception occasion among candidate PDSCH reception occasions for the semi-static HARQ-ACK codebook,
wherein the HARQ-ACK information bit is identical to a result of a logical AND operation of HARQ-ACK information bits corresponding to a plurality of PDSCHs, and
wherein the plurality of PDSCHs that do not overlap with an UL symbol configured by the TDD configuration are scheduled by the DCI.

12. The method of claim 11,
wherein, for each slot of a downlink (DL) slot set, at least one symbol of each PDSCH time resource derived by a row r of a set R' is configured as UL by the TDD configuration, a set R is set as R\r and the set R' is set as R'\r for the candidate PDSCH reception occasions, and
wherein the set R' includes a plurality of SLIVs of rows in the TDRA table, and the set R includes last SLIVs of the rows.

13. The method of claim 12,
"" "" wherein a number of slots in the DL slot set is associated with a value $\Delta K_{0,r}(d)$, and
wherein $$d - 0, 1, \ldots, "C(\Delta K_{0,r}) - 1, \Delta K_{0,r} = \max_{K_0}(K_{0,r}) - K_{0,r}, "C(\Delta K_{0,r})$$

is cardinality of $\Delta K_{0,r}$, $K_{0,r}$ is slot offset $K_0$ values for the row r.

14. The method of claim 11,
wherein in case that a PDSCH associated with the candidate PDSCH reception occasion is associated with a last SLIV among the more than one SLIVs included in the row indicated by the information, the HARQ-ACK information bit is identical to the result of the logical AND operation of the HARQ-ACK information bits corresponding to the plurality of PDSCHs, and
wherein in case that the PDSCH associated with the candidate PDSCH reception occasion is not associated with the last SLIV, the HARQ-ACK information bit corresponds to negative ACK (NACK).

15. The method of claim 11,
wherein the semi-static HARQ-ACK codebook is received via a physical uplink control channel (PUCCH) in an UL slot $n_U$, and
wherein each slot of the DL slot set corresponds to a value plus $n_D - \Delta K_{0,r}(d)$, where:
the value corresponds to a smallest index of a DL slot overlapping with an UL slot $n_U - K_{1,k}$,
k is an index of slot timing values $K_{1,k}$,
$n_D$ is an index of a DL slot overlapping with an UL slot, and $$d = 0, 1, \ldots, "C"(\Delta K\_"0,r") - 1, \Delta K_{0,r} = \max_{K_0}(K_{0,r}) - K_{0,r}, "C"(\Delta K\_"0,r")$$

is cardinality of $$\Delta K_{0,r}, K_{0,r}$$

is slot offset $K_0$ values for the row r.

16. A base station (BS) in a communication system, the BS comprising:
a transceiver; and
a processor coupled with the transceiver and configured to:
transmit, via higher layer signaling, a time domain bundling configuration information to enable bundling corresponding to a logical AND operation for a semi-static hybrid automatic repeat request acknowledgement (HARQ-ACK) codebook;
transmit, via the higher layer signaling, a time domain duplex (TDD) configuration;
transmit downlink control information (DCI) including information indicating a row including more than one starting and length values (SLIVs) of a time domain resource allocation (TDRA) table; and
receive the semi-static HARQ-ACK codebook;
wherein the semi-static HARQ-ACK codebook includes a HARQ-ACK information bit associated with a candidate physical downlink shared channel (PDSCH) reception occasion among candidate PDSCH reception occasions for the semi-static HARQ-ACK codebook;
wherein the HARQ-ACK information bit is identical to a result of a logical AND operation of HARQ-ACK information bits corresponding to a plurality of PDSCHs, and
wherein the plurality of PDSCHs, that do not overlap with an UL symbol configured by the TDD configuration are scheduled by the DCI.

17. The BS of claim 16,
wherein for each slot of a downlink (DL) slot set, at least one symbol of each PDSCH time resource derived by a row r of a set R' is configured as UL by the TDD configuration, a set R is set as R\r and the set R' is set as R'\r for the candidate PDSCH reception occasions, and wherein the set R' includes a plurality of SLIVs of rows in the TDRA table, and the set R includes last SLIVs of the rows.

18. The BS of claim 17,
"" "" wherein a number of slots in the DL slot set is associated with a value $\Delta K_{0,r}(d)$, and
wherein $$d = 0, 1, \ldots, C(\Delta K_{0,r}) - 1, \Delta K_{0,r} = \max_{K_0}(K_{0,r}) - K_{0,r}, C(\Delta K_{0,r})$$

is cardinality of $\Delta K_{0,r}$, $K_{0,r}$ is slot offset $K_0$ values for the row r.

19. The BS of claim 16,
wherein in case that a PDSCH associated with the candidate PDSCH reception occasion is associated with a last SLIV among the more than one SLIVs included in the row indicated by the information, the HARQ-ACK information bit is identical to the result of the logical AND operation of the HARQ-ACK information bits corresponding to the plurality of PDSCHs, and wherein in case that the PDSCH associated with the candidate PDSCH reception occasion is not associated with the last SLIV, the HARQ-ACK information bit corresponds to negative ACK (NACK).

20. The BS of claim 16,
wherein the semi-static HARQ-ACK codebook is received via a physical uplink control channel (PUCCH) in an UL slot $n_U$, and wherein each slot of the DL slot set corresponds to a value plus $n_D - \Delta K_{0,r}(d)$, where:

the value corresponds to a smallest index of a DL slot overlapping with an UL slot $n_U - K_{1,k}$, k is an index of slot timing values $K_{1,k}$, $n_D$ is an index of a DL slot overlapping with an UL slot, and $$d = 0, 1, \ldots, "C"\left(\Delta K\_"0,r" - 1, \Delta K_{0,r} = \max_{K_0}(K_{0,r}) - K_{0,r}, "C"(\Delta K\_"0,r")\right)$$

is cardinality of $\Delta K_{0,r}$, $K_{0,r}$ is slot offset $K_0$ values for the row r.

* * * * *